United States Patent
Chen et al.

(10) Patent No.: US 11,013,008 B2
(45) Date of Patent: May 18, 2021

(54) METHOD AND APPARATUS OF HANDLING DEVICE-TO-DEVICE RESOURCE RELEASE IN A WIRELESS COMMUNICATION SYSTEM

(71) Applicant: ASUSTek Computer Inc., Taipei (TW)

(72) Inventors: Wei-Yu Chen, Taipei (TW); Li-Chih Tseng, Taipei (TW); Li-Te Pan, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/454,810

(22) Filed: Jun. 27, 2019

(65) Prior Publication Data
US 2020/0008183 A1   Jan. 2, 2020

Related U.S. Application Data

(60) Provisional application No. 62/692,553, filed on Jun. 29, 2018.

(51) Int. Cl.
*H04W 72/04* (2009.01)
*H04W 76/34* (2018.01)
*H04W 72/14* (2009.01)

(52) U.S. Cl.
CPC ..... *H04W 72/048* (2013.01); *H04W 72/0446* (2013.01); *H04W 76/34* (2018.02); *H04W 72/14* (2013.01)

(58) Field of Classification Search
CPC .................................................... H04W 76/34
See application file for complete search history.

(56) References Cited

U.S. PATENT DOCUMENTS

| | | | |
|---|---|---|---|
| 2016/0128115 A1* | 5/2016 | Panteleev | H04W 76/14 370/329 |
| 2016/0309430 A1* | 10/2016 | Chae | H04W 72/0446 |
| 2017/0019881 A1 | 1/2017 | Cao | |
| 2017/0064733 A1* | 3/2017 | Lee | H04W 72/1278 |
| 2017/0257803 A1* | 9/2017 | Tenny | H04W 4/70 |
| 2017/0285177 A1* | 10/2017 | Jin | G01S 19/42 |
| 2018/0098322 A1 | 4/2018 | Yoon | |
| 2018/0199225 A1* | 7/2018 | Kim | H04W 76/10 |
| 2018/0317276 A1 | 11/2018 | Lei | |
| 2018/0338319 A1* | 11/2018 | Kim | H04W 72/044 |
| 2019/0045507 A1* | 2/2019 | Sorrentino | H04W 72/042 |
| 2019/0253531 A1* | 8/2019 | Basu Mallick | H04L 69/22 |
| 2020/0195389 A1* | 6/2020 | Basu Mallick | H04L 1/08 |

\* cited by examiner

*Primary Examiner* — Fahmida S Chowdhury
(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE performing a first device-to-device (D2D) transmission based on a periodic resource. The method further includes the UE performs a second D2D transmission based on the periodic resource in response to no data available for the second D2D transmission, wherein the second D2D transmission indicates release of the periodic resource. The method also includes the UE stops using the periodic resource to perform a third D2D transmission.

17 Claims, 24 Drawing Sheets

R/R/E/LCID sub-header

| Index | LCID values |
|---|---|
| 00000 | Reserved |
| 00001-01010 | Identity of the logical channel |
| 01011-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

FIG. 10 (PRIOR ART)

| Index | Size of Length field (in bits) |
|---|---|
| 0 | 7 |
| 1 | 15 |

FIG. 11 (PRIOR ART)

METHOD AND APPARATUS OF HANDLING DEVICE-TO-DEVICE RESOURCE RELEASE IN A WIRELESS COMMUNICATION SYSTEM

CROSS-REFERENCE TO RELATED APPLICATIONS

The present application claims the benefit of U.S. Provisional Patent Application Ser. No. 62/692,553 filed on Jun. 29, 2018, the entire disclosure of which is incorporated herein in its entirety by reference.

FIELD

This disclosure generally relates to wireless communication networks, and more particularly, to a method and apparatus of handling device-to-device resource release in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE performing a first device-to-device (D2D) transmission based on a periodic resource. The method further includes the UE performs a second D2D transmission based on the periodic resource in response to no data available for the second D2D transmission, wherein the second D2D transmission indicates release of the periodic resource. The method also includes the UE stops using the periodic resource to perform a third D2D transmission.

BRIEF DESCRIPTION OF THE DRAWINGS

FIG. 10 is a reproduction of Table 6.2.4-1 of 3GPP TS 36.321 V15.1.0.

FIG. 11 is a reproduction of Table 6.2.4-2 of 3GPP TS 36.321 V15.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.321 V15.1.0, "Evolved Universal Terrestrial Radio Access (E-UTRA); Medium Access Control (MAC) protocol specification"; TS 36.331 V15.1.0, "Evolved Universal Terrestrial Radio Access (E-UTRA); Radio Resource Control (RRC); Protocol specification"; and TS 36.213 V15.1.0, "Evolved Universal Terrestrial Radio Access (E-UTRA); Physical layer procedures". The standards and documents listed above are hereby expressly incorporated by reference in their entirety.

Figure 1:
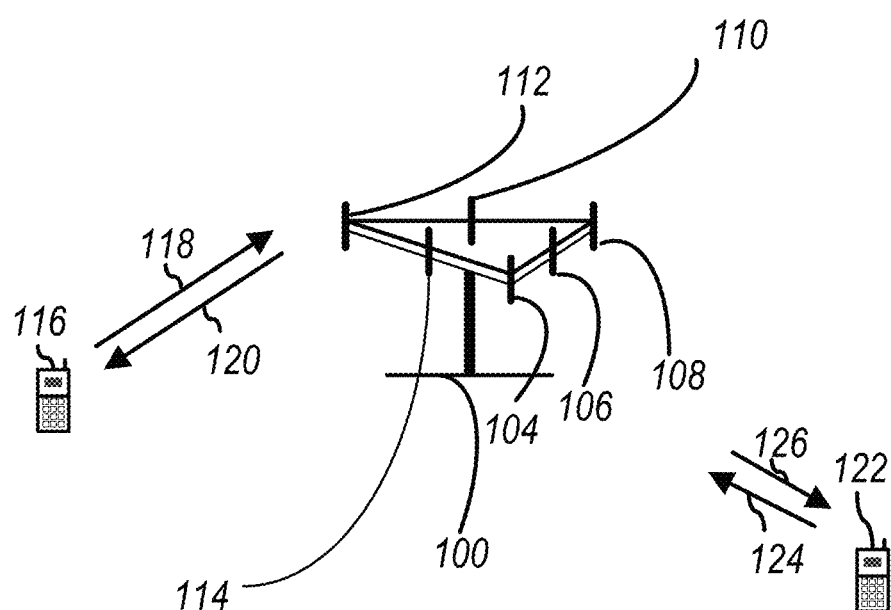
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
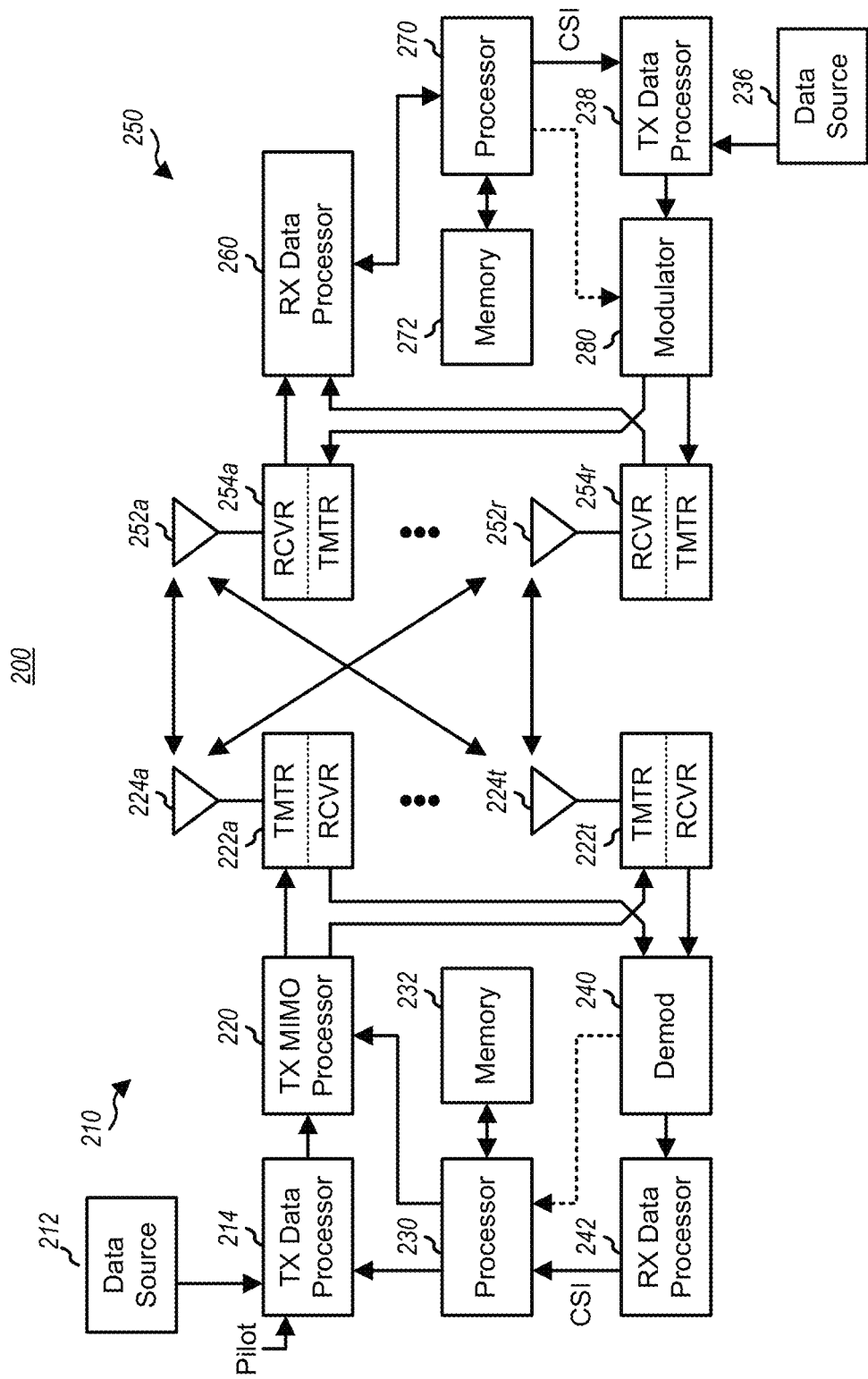
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
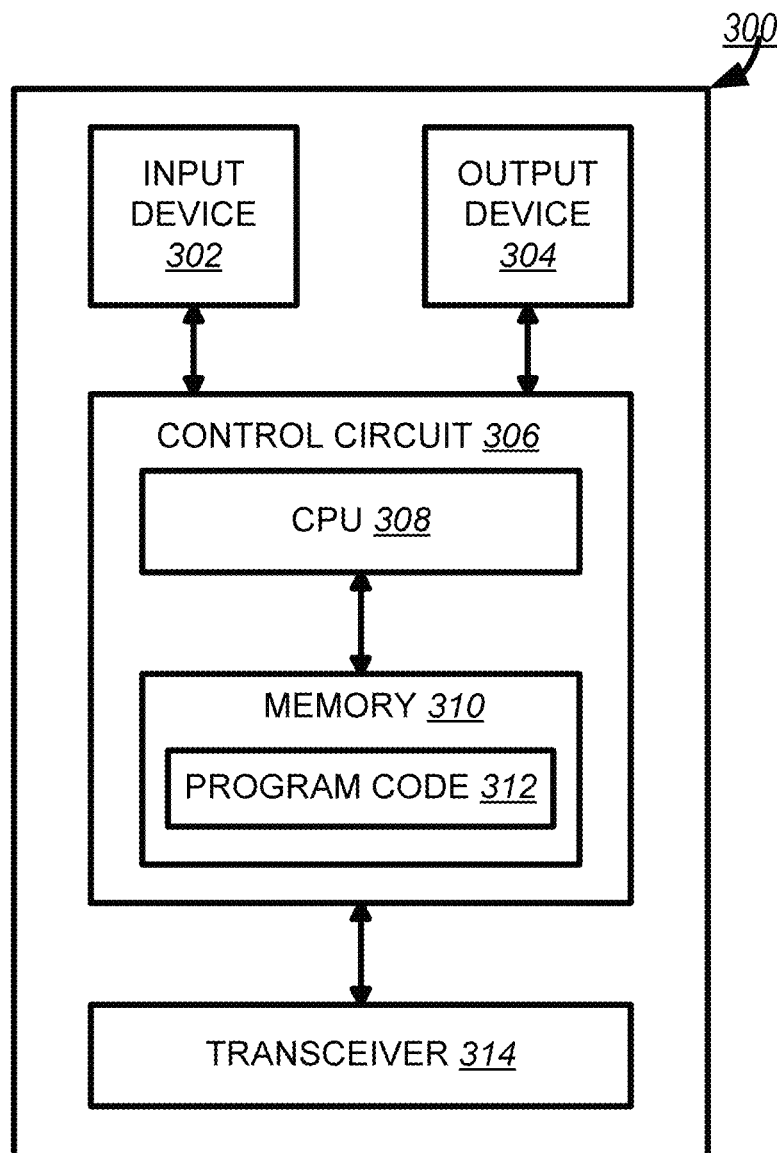
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314.

The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
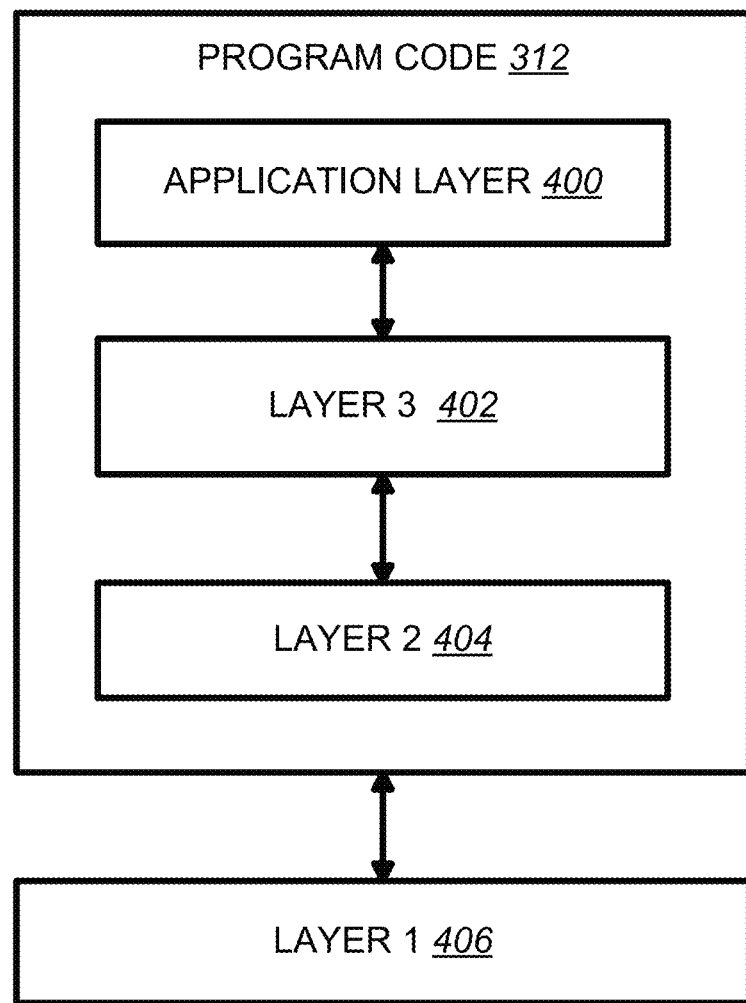
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.321 V15.1.0 provides the following detail D2D (Device-to-Device) V2X (Vehicle-to-Everything) procedures in MAC (Medium Access Control):

5.14 SL-SCH Data Transfer
5.14.1 SL-SCH Data Transmission
5.14.1.1 SL Grant Reception and SCI Transmission In order to transmit on the SL-SCH the MAC entity must have at least one sidelink grant. Sidelink grants are selected as follows for sidelink communication:
  if the MAC entity is configured to receive a single sidelink grant dynamically on the PDCCH and more data is available in STCH than can be transmitted in the current SC period, the MAC entity shall:
    using the received sidelink grant determine the set of subframes in which transmission of SCI and transmission of first transport block occur according to subclause 14.2.1 of [2];
    consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
    clear the configured sidelink grant at the end of the corresponding SC Period;
  else, if the MAC entity is configured by upper layers to receive multiple sidelink grants dynamically on the PDCCH and more data is available in STCH than can be transmitted in the current SC period, the MAC entity shall for each received sidelink grant:
    using the received sidelink grant determine the set of subframes in which transmission of SCI and transmission of first transport block occur according to subclause 14.2.1 of [2];
    consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
    clear the configured sidelink grant at the end of the corresponding SC Period;
  else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:
    if configured by upper layers to use a single pool of resources:
      select that pool of resources for use;
    else, if configured by upper layers to use multiple pools of resources:
      select a pool of resources for use from the pools of resources configured by upper layers whose associated priority list includes the priority of the highest priority of the sidelink logical channel in the MAC PDU to be transmitted;
  NOTE: If more than one pool of resources has an associated priority list which includes the priority of the sidelink logical channel with the highest priority in the MAC PDU to be transmitted, it is left for UE implementation which one of those pools of resources to select.
    randomly select the time and frequency resources for SL-SCH and SCI of a sidelink grant from the selected resource pool. The random function shall be such that each of the allowed selections [2] can be chosen with equal probability;
    use the selected sidelink grant to determine the set of subframes in which transmission of SCI and transmission of first transport block occur according to subclause 14.2.1 of [2];
    consider the selected sidelink grant to be a configured sidelink grant occurring in those subframes starting at the beginning of the first available SC Period which starts at least 4 subframes after the subframe in which the sidelink grant was selected;
    clear the configured sidelink grant at the end of the corresponding SC Period;
  NOTE: Retransmissions on SL-SCH cannot occur after the configured sidelink grant has been cleared.
  NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.

Sidelink grants are selected as follows for V2X sidelink communication:
  if the MAC entity is configured to receive a sidelink grant dynamically on the PDCCH and data is available in STCH, the MAC entity shall:
    use the received sidelink grant to determine the number of HARQ retransmissions and the set of subframes in which transmission of SCI and SL-SCH occur according to subclause 14.2.1 and 14.1.1.4A of [2];
    consider the received sidelink grant to be a configured sidelink grant;
  if the MAC entity is configured by upper layers to receive a sidelink grant on the PDCCH addressed to SL Semi-Persistent Scheduling V-RNTI, the MAC entity shall for each SL SPS configuration:
    if PDCCH contents indicate SPS activation:
      use the received sidelink grant to determine the number of HARQ retransmissions and the set of subframes in which transmission of SCI and SL-SCH occur according to subclause 14.2.1 and 14.1.1.4A of [2];
consider the received sidelink grant to be a configured sidelink grant;
if PDCCH contents indicate SPS release:
clear the corresponding configured sidelink grant;
if the MAC entity is configured by upper layers to transmit using a pool of resources as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH, the MAC entity shall for each Sidelink process configured for multiple transmissions:
if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
if neither transmission nor retransmission has been performed by the MAC entity on any resource indicated in the configured sidelink grant during the last second; or
if sl-ReselectAfter is configured and the number of consecutive unused transmission opportunities on resources indicated in the configured sidelink grant is equal to sl-ReselectAfter; or
if there is no configured sidelink grant; or
if the configured sidelink grant cannot accommodate a RLC SDU by using the maximum allowed MCS configured by upper layers in maxMCS-PSSCH and the MAC entity selects not to segment the RLC SDU; or
NOTE: If the configured sidelink grant cannot accommodate the RLC SDU, it is left for UE implementation whether to perform segmentation or sidelink resource reselection.
if transmission(s) with the configured sidelink grant cannot fulfil the latency requirement of the data in a sidelink logical channel according to the associated PPPP, and the MAC entity selects not to perform transmission(s) corresponding to a single MAC PDU; or
NOTE: If the latency requirement is not met, it is left for UE implementation whether to perform transmission(s) corresponding to single MAC PDU or sidelink resource reselection.
if a pool of resources is configured or reconfigured by upper layers:
clear the configured sidelink grant, if available;
select one of the allowed values configured by upper layers in restrictResourceReservationPeriod and set the resource reservation interval by multiplying 100 with the selected value;
NOTE: How the UE selects this value is up to UE implementation.
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;
if transmission based on random selection is configured by upper layers:
randomly select the time and frequency resources for one transmission opportunity from the resource pool, according to the amount of selected frequency resources. The random function shall be such that each of the allowed selections can be chosen with equal probability;
else:
randomly select the time and frequency resources for one transmission opportunity from the resources indicated by the physical layer according to subclause 14.1.1.6 of [2], according to the amount of selected frequency resources. The random function shall be such that each of the allowed selections can be chosen with equal probability;
use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];
if the number of HARQ retransmissions is equal to 1 and there are available resources left in the resources indicated by the physical layer that meet the conditions in subclause 14.1.1.7 of [2] for more transmission opportunities:
randomly select the time and frequency resources for one transmission opportunity from the available resources, according to the amount of selected frequency resources. The random function shall be such that each of the allowed selections can be chosen with equal probability;
use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;
consider the set of new transmission opportunities and retransmission opportunities as the selected sidelink grant.
else:
consider the set as the selected sidelink grant;
use the selected sidelink grant to determine the set of subframes in which transmissions of SCI and SL-SCH occur according to subclause 14.2.1 and 14.1.1.4B of [2];
consider the selected sidelink grant to be a configured sidelink grant;
else if SL_RESOURCE_RESELECTION_COUNTER=0 and when SL_RESOURCE_RESELECTION_ COUNTER was equal to 1 the MAC entity randomly selected, with equal probability, a value in the interval [0, 1] which is less than or equal to the probability configured by upper layers in probResourceKeep:
clear the configured sidelink grant, if available;
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
use the previously selected sidelink grant for the number of transmissions of the MAC PDUs determined in subclause 14.1.1.4B of [2] with the resource reservation interval to determine the set of subframes in which transmissions of SCI and SL-SCH occur according to subclause 14.2.1 and 14.1.1.4B of [2];
consider the selected sidelink grant to be a configured sidelink grant;
else, if the MAC entity is configured by upper layers to transmit using a pool of resources as indicated in subclause 5.10.13.1 of [8], the MAC entity selects to create a configured sidelink grant corresponding to transmission(s) of a single MAC PDU, and data is available in STCH, the MAC entity shall for a Sidelink process:
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) and the CBR measured by lower layers according to [6] if CBR measurement results are available or the corresponding defaultTxConfig-Index configured by upper layers if CBR measurement results are not available;
if transmission based on random selection is configured by upper layers:
randomly select the time and frequency resources for one transmission opportunity of SCI and SL-SCH from the resource pool, according to the amount of selected frequency resources. The random function shall be such that each of the allowed selections can be chosen with equal probability;
else:
randomly select the time and frequency resources for one transmission opportunity of SCI and SL-SCH from the resource pool indicated by the physical layer according to subclause 14.1.1.6 of [2], according to the amount of selected frequency resources. The random function shall be such that each of the allowed selections can be chosen with equal probability;
if the number of HARQ retransmissions is equal to 1:
if transmission based on random selection is configured by upper layers and there are available resources that meet the conditions in subcause 14.1.1.7 of [2] for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
else, if transmission based on sensing or partial sensing is configured by upper layers and there are available resources left in the resources indicated by the physical layer that meet the conditions in subcause 14.1.1.7 of [2] for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
consider a transmission opportunity which comes first in time as the new transmission opportunity and a transmission opportunity which comes later in time as the retransmission opportunity;
consider both of the transmission opportunities as the selected sidelink grant;
else:
consider the transmission opportunity as the selected sidelink grant;
use the selected sidelink grant to determine the subframes in which transmission(s) of SCI and SL-SCH occur according to subclause 14.2.1 and 14.1.1.4B of [2];
consider the selected sidelink grant to be a configured sidelink grant;
NOTE: For V2X sidelink communication, the UE should ensure the randomly selected time and frequency resources fulfill the latency requirement.
NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:
if the MAC entity has a configured sidelink grant occurring in this subframe:
  if SL_RESOURCE_RESELECTION_COUNTER=1 and the MAC entity randomly selected, with equal probability, a value in the interval [0, 1] which is above the probability configured by upper layers in probResourceKeep:
    set the resource reservation interval equal to 0;
  if the configured sidelink grant corresponds to transmission of SCI:
    instruct the physical layer to transmit SCI corresponding to the configured sidelink grant;
    for V2X sidelink communication, deliver the configured sidelink grant, the associated HARQ information and the value of the highest priority of the sidelink logical channel(s) in the MAC PDU to the Sidelink HARQ Entity for this subframe;
  else if the configured sidelink grant corresponds to transmission of first transport block for sidelink communication:
    deliver the configured sidelink grant and the associated HARQ information to the Sidelink HARQ Entity for this subframe.
  NOTE: If the MAC entity has multiple configured grants occurring in one subframe and if not all of them can be processed due to the single-cluster SC-FDM restriction, it is left for UE implementation which one of these to process according to the procedure above.

5.14.1.2 Sidelink HARQ Operation
5.14.1.2.1 Sidelink HARQ Entity

There is one Sidelink HARQ Entity at the MAC entity for transmission on SL-SCH, which maintains a number of parallel Sidelink processes.

For sidelink communication, the number of transmitting Sidelink processes associated with the Sidelink HARQ Entity is defined in [8].

For V2X sidelink communication, the maximum number of transmitting Sidelink processes associated with the Sidelink HARQ Entity is 8. A sidelink process may be configured for transmissions of multiple MAC PDUs. For transmissions of multiple MAC PDUs, the maximum number of transmitting Sidelink processes with the Sidelink HARQ Entity is 2.

A delivered and configured sidelink grant and its associated HARQ information are associated with a Sidelink process.

For each subframe of the SL-SCH and each Sidelink process, the Sidelink HARQ Entity shall:
if a sidelink grant corresponding to a new transmission opportunity has been indicated for this Sidelink process and there is SL data, for sidelink logical channels of ProSe destination associated with this sidelink grant, available for transmission:
  obtain the MAC PDU from the "Multiplexing and assembly" entity;
  deliver the MAC PDU and the sidelink grant and the HARQ information to this Sidelink process;
  instruct this Sidelink process to trigger a new transmission.
else, if this subframe corresponds to retransmission opportunity for this Sidelink process:
  instruct this Sidelink process to trigger a retransmission.
NOTE: The resources for retransmission opportunities are specified in subclause 14.2.1 of [2] unless specified in subclause 5.14.1.1.

5.14.1.2.2 Sidelink Process

The Sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant as specified in subclause 5.14.1.1 and with the MCS configured by upper layers (if configured) unless selected below.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the Sidelink HARQ Entity requests a new transmission, the Sidelink process shall:
  for V2X sidelink communication in UE autonomous resource selection:
    select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
  NOTE 1: MCS selection is up to UE implementation if the MCS or the corresponding range is not configured by upper layers.
  NOTE 2: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
  set CURRENT_IRV to 0;
  store the MAC PDU in the associated HARQ buffer;
  store the sidelink grant received from the Sidelink HARQ Entity;
  generate a transmission as described below.
If the Sidelink HARQ Entity requests a retransmission, the Sidelink process shall:
  generate a transmission as described below.
To generate a transmission, the Sidelink process shall:
if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
- instruct the physical layer to generate a transmission according to the stored sidelink grant with the redundancy version corresponding to the CURRENT_IRV value.

increment CURRENT_IRV by 1;

if this transmission corresponds to the last transmission of the MAC PDU:
- decrement SL_RESOURCE_RESELECTION_COUNTER by 1, if available.

The transmission of V2X sidelink communication is prioritized over uplink transmission if the following conditions are met:
- if the MAC entity is not able to perform uplink transmissions and transmissions of V2X sidelink communication simultaneously at the time of the transmission; and
- if uplink transmission is not prioritized by upper layer according to [15]; and
- if the value of the highest priority of the sidelink logical channel(s) in the MAC PDU is lower than thresSL-TxPrioritization if thresSL-TxPrioritization is configured.

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP. Multiple sidelink logical channels may have the same associated priority. The mapping between priority and LCID is left for UE implementation.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:
- Only consider sidelink logical channels not previously selected for this SC period and the SC periods (if any) which are overlapping with this SC period, to have data available for transmission in sidelink communication.
- Step 0: Select a ProSe Destination, having the sidelink logical channel with the highest priority, among the sidelink logical channels having data available for transmission;

For each MAC PDU associated to the SCI:
- Step 1: Among the sidelink logical channels belonging to the selected ProSe Destination and having data available for transmission, allocate resources to the sidelink logical channel with the highest priority;
- Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:
- the UE should not segment an RLC SDU (or partially transmitted SDU) if the whole SDU (or partially transmitted SDU) fits into the remaining resources;
- if the UE segments an RLC SDU from the sidelink logical channel, it shall maximize the size of the segment to fill the grant as much as possible;
- the UE should maximise the transmission of data;
- if the MAC entity is given a sidelink grant size that is equal to or larger than 10 bytes (for sidelink communication) or 11 bytes (for V2X sidelink communication) while having data available for transmission, the MAC entity shall not transmit only padding.

5.14.1.3.2 Multiplexing of MAC SDUs

The MAC entity shall multiplex MAC SDUs in a MAC PDU according to subclauses 5.14.1.3.1 and 6.1.6.

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority of the sidelink logical channel and the mapping between LCG ID and priority which is provided by upper layers in logicalChGroupInfoList [8]. LCG is defined per ProSe Destination. A sidelink Buffer Status Report (BSR) shall be triggered if any of the following events occur:
- if the MAC entity has a configured SL-RNTI or a configured SL-V-RNTI:
  - SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
  - UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
  - retx-BSR-TimerSL expires and the MAC entity has data available for transmission for any of the sidelink logical channels, in which case the Sidelink BSR is referred below to as "Regular Sidelink BSR";

periodic-BSR-TimerSL expires, in which case the Sidelink BSR is referred below to as "Periodic Sidelink BSR";

else:

An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:

if the number of bits in the UL grant is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

For Padding Sidelink BSR:

if the number of padding bits remaining after a Padding BSR has been triggered is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:

if the MAC entity has UL resources allocated for new transmission for this TTI and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart periodic-BSR-TimerSL except when all the generated Sidelink BSRs are Truncated Sidelink BSRs;

start or restart retx-BSR-TimerSL;

else if a Regular Sidelink BSR has been triggered:

if an uplink grant is not configured:

a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

5.14.2 SL-SCH Data Reception 5.14.2.1 SCI Reception

SCI transmitted on the PSCCH indicate if there is a transmission on SL-SCH and provide the relevant HARQ information.

The MAC entity shall:

for each subframe during which the MAC entity monitors PSCCH:

if SCI for this subframe has been received on the PSCCH for sidelink communication with a Group Destination ID of interest to this MAC entity:

determine the set of subframes in which reception of the first transport blocks occur according to subclause 14.2.2 of [2] using the received SCI;

store the SCI and associated HARQ information as SCI valid for the subframes corresponding to first transmission of each transport block;

else if SCI for this subframe has been received on the PSCCH for V2X sidelink communication:

determine the set of subframes in which reception of the transport block occur according to subclause 14.1.2 of [2] using the received SCI;

store the SCI and associated HARQ information as SCI valid for the subframes corresponding to transmission(s) of the transport block;

for each subframe for which the MAC entity has a valid SCI:

deliver the SCI and the associated HARQ information to the Sidelink HARQ Entity.

5.14.2.2 Sidelink HARQ Operation 5.14.2.2.1 Sidelink HARQ Entity

There is one Sidelink HARQ Entity at the MAC entity for reception of the SL-SCH which maintains a number of parallel Sidelink processes.

Each Sidelink process is associated with SCI in which the MAC entity is interested. If SCI includes the Group Destination ID, this interest is as determined by the Group Destination ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in [8].

For each subframe of the SL-SCH, the Sidelink HARQ Entity shall:
 for each SCI valid in this subframe:
  allocate the TB received from the physical layer and the associated HARQ information to a Sidelink process, associate this Sidelink process with this SCI and consider this transmission to be a new transmission.
 for each Sidelink process:
  if this subframe corresponds to retransmission opportunity for the Sidelink process according to its associated SCI:
   allocate the TB received from the physical layer and the associated HARQ information to the Sidelink process and consider this transmission to be a retransmission.

5.14.2.2.2 Sidelink Process

For each subframe where a transmission takes place for the Sidelink process, one TB and the associated HARQ information is received from the Sidelink HARQ Entity.

The sequence of redundancy versions is 0, 2, 3, 1. The variable CURRENT_IRV is an index into the sequence of redundancy versions. This variable is updated modulo 4.

For each received TB and associated HARQ information, the Sidelink process shall:
 if this is a new transmission:
  set CURRENT_IRV to 0;
  store the received data in the soft buffer and optionally attempt to decode the received data according to CURRENT_IRV.
 else if this is a retransmission:
  if the data for this TB has not yet been successfully decoded:
   increment CURRENT_IRV by 1;
   combine the received data with the data currently in the soft buffer for this TB and optionally attempt to decode the combined data according to the CURRENT_IRV.
 if the data which the MAC entity attempted to decode was successfully decoded for this TB:
  if this is the first successful decoding of the data for this TB:
   if the DST field of the decoded MAC PDU subheader is equal to the 16 MSB of any of the Destination Layer-2 ID(s) of the UE for which the 8 LSB are equal to the Group Destination ID in the corresponding SCI:
    deliver the decoded MAC PDU to the disassembly and demultiplexing entity.
   else if the DST field of the decoded MAC PDU subheader is equal to any of the Destination Layer-2 ID(s) of the UE:
    deliver the decoded MAC PDU to the disassembly and demultiplexing entity.

5.14.2.3 Disassembly and Demultiplexing

The MAC entity shall disassemble and demultiplex a MAC PDU as defined in subclause 6.1.6.

[ . . . ]

6.1.6 MAC PDU (SL-SCH)

Figure 6:
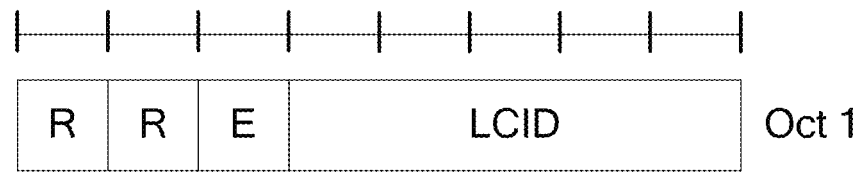
FIG. 6 is a reproduction of FIG. 6.1.6-2 of 3GPP TS 36.321 V15.1.0.

A MAC PDU consists of a MAC header, one or more MAC Service Data Units (MAC SDU), and optionally padding; as described in FIG. 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

Figure 5:
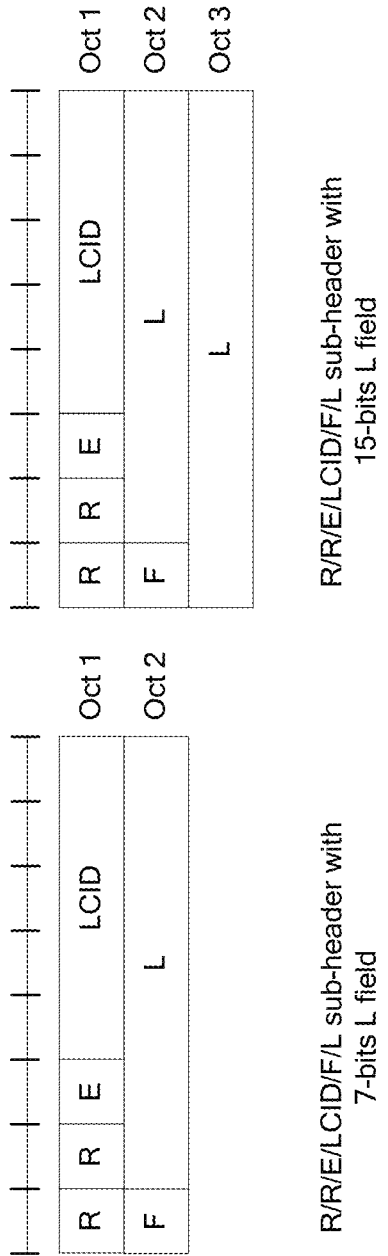
FIG. 5 is a reproduction of FIG. 6.1.6-1 of 3GPP TS 36.321 V15.1.0.

[FIG. 6.1.6-1 of 3GPP TS 36.321 V15.1.0, entitled "R/R/E/LCID/F/L MAC subheader", is reproduced as FIG. 5]

[FIG. 6.1.6-2 of 3GPP TS 36.321 V15.1.0, entitled "R/R/E/LCID MAC subheader", is reproduced as FIG. 6]

Figure 7:
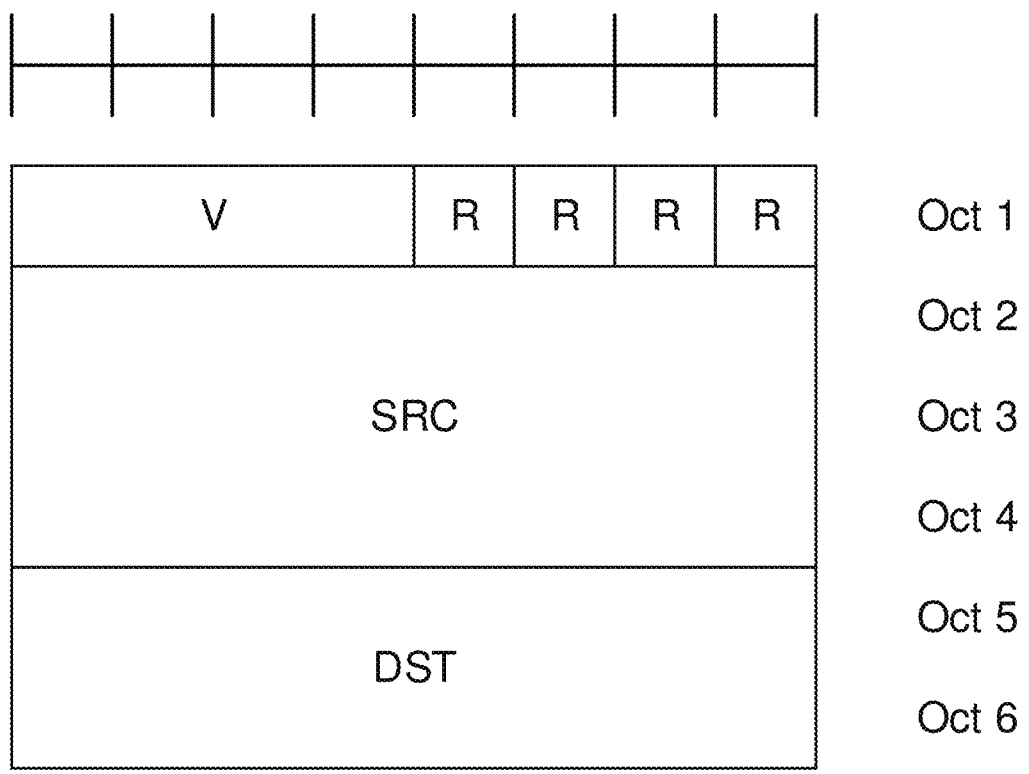
FIG. 7 is a reproduction of FIG. 6.1.6-3 of 3GPP TS 36.321 V15.1.0.

[FIG. 6.1.6-3 of 3GPP TS 36.321 V15.1.0, entitled "SL-SCH MAC subheader for V='0001' and '0010'", is reproduced as FIG. 7]

Figure 8:
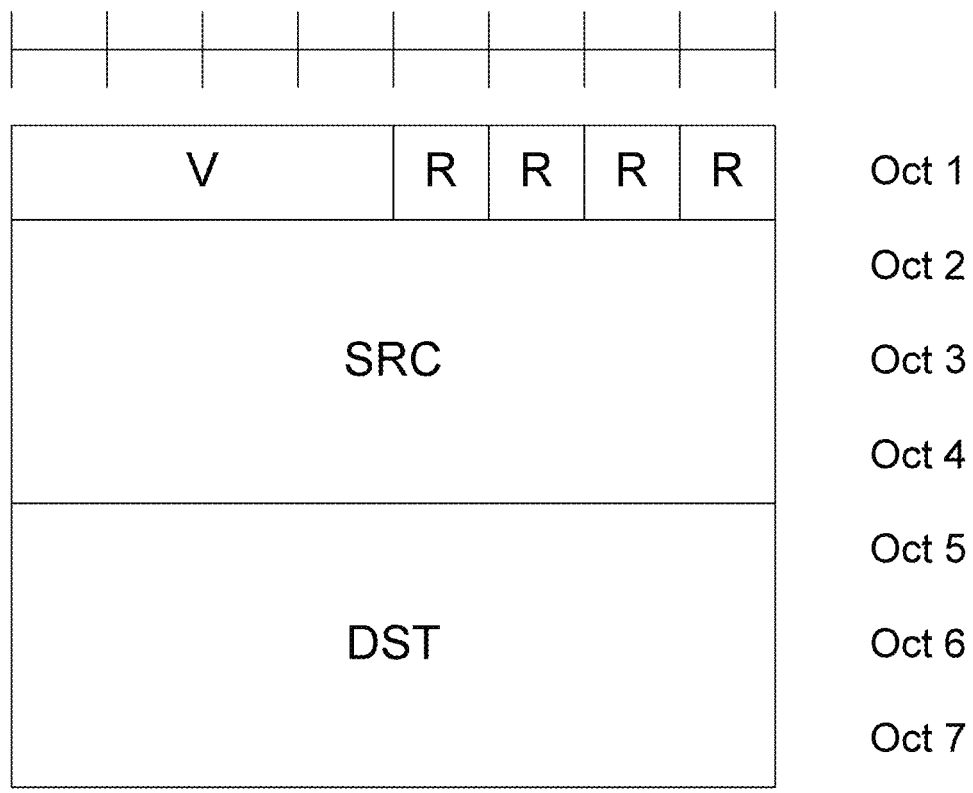
FIG. 8 is a reproduction of FIG. 6.1.6-3a of 3GPP TS 36.321 V15.1.0.

[FIG. 6.1.6-3a of 3GPP TS 36.321 V15.1.0, entitled "SL-SCH MAC subheader for V='0011'". is reproduced as FIG. 8]

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 9:
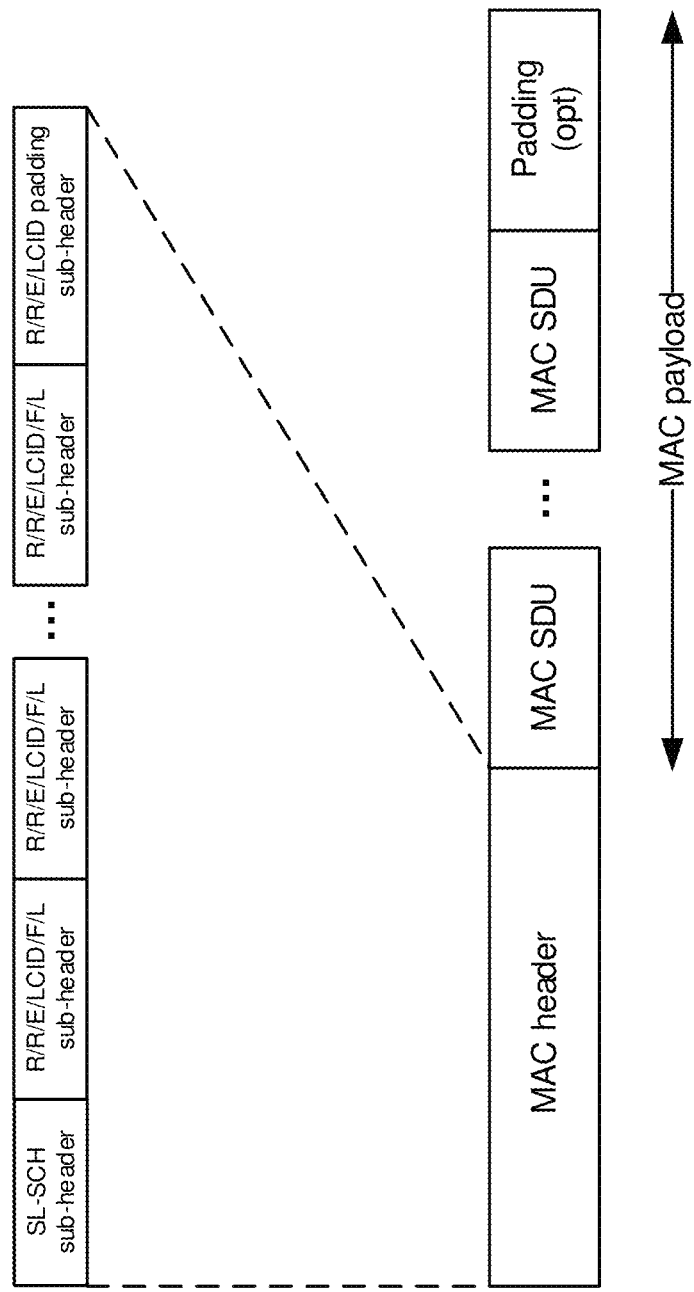
FIG. 9 is a reproduction of FIG. 6.1.6-4 of 3GPP TS 36.321 V15.1.0.

[FIG. 6.1.6-4 of 3GPP TS 36.321 V15.1.0, entitled "Example of MAC PDU consisting of MAC header, MAC SDUs and padding". is reproduced as FIG. 9]

[ . . . ]

6.2.4 MAC Header for SL-SCH

The MAC header is of variable size and consists of the following fields:
 V: The MAC PDU format version number field indicates which version of the SL-SCH subheader is used. In this version of the specification three format versions are defined, and this field shall therefore be set to "0001", "0010", and "0011". If the DST field is 24 bits this field shall be set to "0011". The V field size is 4 bits;
 SRC: The Source Layer-2 ID field carries the identity of the source. It is set to the ProSe UE ID. The SRC field size is 24 bits;
 DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers as defined in [14]. If the V field is set to "0001", this identifier is a groupcast identifier. If the V field is set to "0010", this identifier is a unicast identifier;
 LCID: The Logical Channel ID field uniquely identifies the logical channel instance within the scope of one Source Layer-2 ID and Destination Layer-2 ID pair of the corresponding MAC SDU or padding as described in table 6.2.4-1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;

L: The Length field indicates the length of the corresponding MAC SDU in bytes. There is one L field per MAC PDU subheader except for the last subheader. The size of the L field is indicated by the F field;

F: The Format field indicates the size of the Length field as indicated in table 6.2.4-2. There is one F field per MAC PDU subheader except for the last subheader. The size of the F field is 1 bit. If the size of the MAC SDU is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;

R: Reserved bit, set to "0".

The MAC header and subheaders are octet aligned.

[Table 6.2.4-1 of 3GPP TS 36.321 V15.1.0, entitled "Values of LCID for SL-SCH", is reproduced as FIG. 10]

[Table 6.2.4-2 of 3GPP TS 36.321 V15.1.0, entitled "Values of F field", is reproduced as FIG. 11]

3GPP TS 36.331 V15.1.0 provides the following detail D2D V2X procedures in RRC (Radio Resource Control):

5.6.10 UE Assistance Information 5.6.10.1 General

Figure 12:
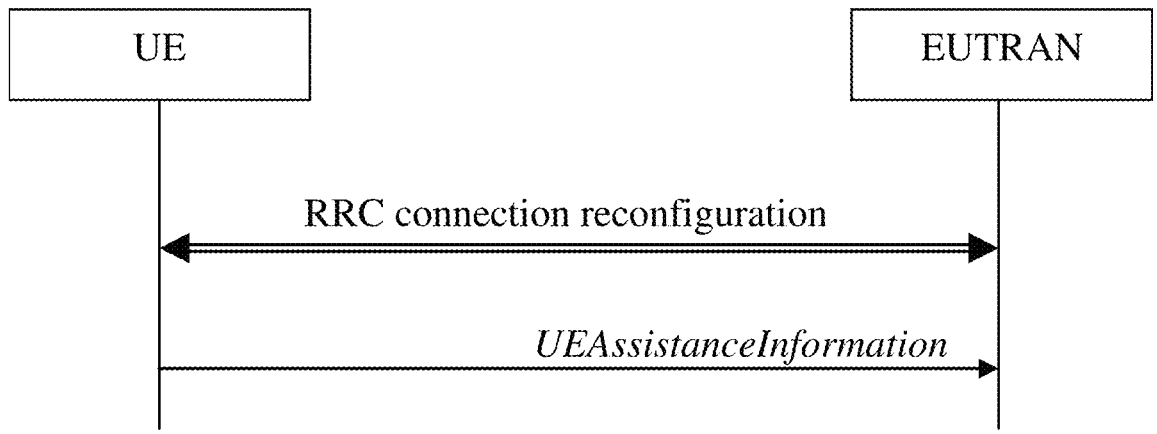
FIG. 12 is a reproduction of FIG. 5.6.10.1-1 of 3GPP TS 36.331 V15.1.0.

[FIG. 5.6.10.1-1 of 3GPP TS 36.331 V15.1.0, entitled "UE Assistance Information", is reproduced as FIG. 12]

The purpose of this procedure is to inform E-UTRAN of the UE's power saving preference and SPS assistance information, maximum PDSCH/PUSCH bandwidth configuration preference, overheating assistance information, or the UE's delay budget report carrying desired increment/decrement in the Uu air interface delay or connected mode DRX cycle length and for BL UEs or UEs in CE of the RLM event ("early-out-of-sync" or "early-in-sync") and RLM information. Upon configuring the UE to provide power preference indications E-UTRAN may consider that the UE does not prefer a configuration primarily optimised for power saving until the UE explicitly indicates otherwise.

5.6.10.2 Initiation

A UE capable of providing power preference indications in RRC_CONNECTED may initiate the procedure in several cases including upon being configured to provide power preference indications and upon change of power preference. A UE capable of providing SPS assistance information in RRC_CONNECTED may initiate the procedure in several cases including upon being configured to provide SPS assistance information and upon change of SPS assistance information.

A UE capable of providing delay budget report in RRC_CONNECTED may initiate the procedure in several cases, including upon being configured to provide delay budget report and upon change of delay budget preference.

A UE capable of CE mode and providing maximum PDSCH/PUSCH bandwidth preference in RRC_CONNECTED may initiate the procedure upon being configured to provide maximum PDSCH/PUSCH bandwidth preference and/or upon change of maximum PDSCH/PUSCH bandwidth preference.

A UE capable of providing overheating assistance information in RRC_CONNECTED may initiate the procedure if it was configured to do so, upon detecting internal overheating, or upon detecting that it is no longer experiencing an overheating condition.

Upon initiating the procedure, the UE shall:
1> if configured to provide power preference indications:
2> if the UE did not transmit a UEAssistanceInformation message with powerPrefIndication since it was configured to provide power preference indications; or
2> if the current power preference is different from the one indicated in the last transmission of the UEAssistanceInformation message and timer T340 is not running:
3> initiate transmission of the UEAssistanceInformation message in accordance with 5.6.10.3;
1> if configured to provide maximum PDSCH/PUSCH bandwidth preference:
2> if the UE did not transmit a UEAssistanceInformation message with bw-Preference since it was configured to provide maximum PDSCH/PUSCH bandwidth preference; or
2> if the current maximum PDSCH/PUSCH bandwidth preference is different from the one indicated in the last transmission of the UEAssistanceInformation message and timer T341 is not running;
3> initiate transmission of the UEAssistanceInformation message in accordance with 5.6.10.3;
1> if configured to provide SPS assistance information:
2> if the UE did not transmit a UEAssistanceInformation message with sps-AssistanceInformation since it was configured to provide SPS assistance information; or
2> if the current SPS assistance information is different from the one indicated in the last transmission of the UEAssistanceInformation message:
3> initiate transmission of the UEAssistanceInformation message in accordance with 5.6.10.3;
1> if configured to report RLM events:
2> if "early-out-of-sync" event has been detected and T343 is not running; or
2> if "early-in-sync" event has been detected and T344 is not running:
3> initiate transmission of the UEAssistanceInformation message in accordance with 5.6.10.3;
1> if configured to provide delay budget report:
2> if the UE did not transmit a UEAssistanceInformation message with delayBudgetReport since it was configured to provide delay budget report; or
2> if the current delay budget is different from the one indicated in the last transmission of the UEAssistanceInformation message and timer T342 is not running:
3> initiate transmission of the UEAssistanceInformation message in accordance with 5.6.10.3;
1> if configured to provide overheating assistance information:
2> if the overheating condition has been detected and T345 is not running; or
2> if the current overheating assistance information is different from the one indicated in the last transmission of the UEAssistanceInformation message and timer T345 is not running:
3> initiate transmission of the UEAssistanceInformation message in accordance with 5.6.10.3;

5.6.10.3 Actions Related to Transmission of UEAssistanceInformation Message

The UE shall set the contents of the UEAssistanceInformation message for power preference indications:

1> if configured to provide power preference indication and if the UE prefers a configuration primarily optimised for power saving:
  2> set powerPrefIndication to lowPowerConsumption;
1> else if configured to provide power preference indication:
  2> start or restart timer T340 with the timer value set to the powerPrefIndicationTimer;
  2> set powerPrefIndication to normal;

The UE shall set the contents of the UEAssistanceInformation message for SPS assistance information:
1> if configured to provide SPS assistance information:
  2> if there is any traffic for V2X sidelink communication which needs to report SPS assistance information:
    3> include trafficPatternInfoListSL in the UEAssistanceInformation message;
  2> if there is any traffic for uplink communication which needs to report SPS assistance information:
    3> include trafficPatternInfoListUL in the UEAssistanceInformation message;

The UE shall set the contents of the UEAssistanceInformation message for bandwidth preference indications:
1> start timer T341 with the timer value set to the bw-PreferenceIndicationTimer;
1> set bw-Preference to its preferred configuration;

The UE shall set the contents of the UEAssistanceInformation message for delay budget report:
1> if configured to provide delay budget report:
  2> if the UE prefers an adjustment in the connected mode DRX cycle length:
    3> set delayBudgetReport to type1 according to a desired value;
  2> else if the UE prefers coverage enhancement configuration change:
    3> set delayBudgetReport to type2 according to a desired value;
  2> start or restart timer T342 with the timer value set to the delayBudgetReportingProhibitTimer;

The UE shall set the contents of the UEAssistanceInformation message for the RLM report:
1> if T314 has expired:
  2> set rlm-event to earlyOutOfSync;
  2> start timer T343 with the timer value set to the rlmReportTimer;
1> if T315 has expired:
  2> set rlm-event to earlyInSync;
  2> start timer T344 with the timer value set to the rlmReportTimer;
  2> if configured to report rimReportRep-MPDCCH:
    3> set excessRep-MPDCCH to the value indicated by lower layers;

The UE shall set the contents of the UEAssistanceInformation message for overheating assistance indication:
1> if the UE experiences internal overheating:
  2> if the UE prefers to temporarily reduce its DL category and UL category:
    3> include reducedUE-Category in the OverheatingAssistance IE;
    3> set reducedUE-CategoryDL to the number to which the UE prefers to temporarily reduce its DL category;
    3> set reducedUE-CategoryUL to the number to which the UE prefers to temporarily reduce its UL category;
  2> if the UE prefers to temporarily reduce the number of maximum secondary component carriers:
    3> include reducedMaxCCs in the OverheatingAssistance IE;
    3> set reducedCCsDL to the number of maximum SCells the UE prefers to be temporarily configured in downlink;
    3> set reducedCCsUL to the number of maximum SCells the UE prefers to be temporarily configured in uplink;
  2> start timer T345 with the timer value set to the overheatingIndicationProhibitTimer;
1> else (if the UE no longer experiences an overheating condition):
  2> do not include reducedUE-Category and reducedMaxCCs in OverheatingAssistance 1E;
  2> start timer T345 with the timer value set to the overheatingIndicationProhibitTimer;

The UE shall submit the UEAssistanceInformation message to lower layers for transmission.

NOTE 1: It is up to UE implementation when and how to trigger SPS assistance information.

NOTE 2: It is up to UE implementation to set the content of trafficPatternInfoListSL and trafficPatternInfoListUL.

NOTE 3: Traffic patterns for different Destination Layer 2 IDs are provided in different entries in trafficPatternInfoListSL.

[ . . . ]

5.10.1 Introduction

The sidelink communication and associated synchronisation resource configuration applies for the frequency at which it was received/acquired. Moreover, for a UE configured with one or more SCells, the sidelink communication and associated synchronisation resource configuration provided by dedicated signalling applies for the PCell/the primary frequency. The sidelink discovery and associated synchronisation resource configuration applies for the frequency at which it was received/acquired or the indicated frequency in the configuration. For a UE configured with one or more SCells, the sidelink discovery and associated synchronisation resource configuration provided by dedicated signalling applies for the PCell/the primary frequency/any other indicated frequency.

NOTE 1: Upper layers configure the UE to receive or transmit sidelink communication on a specific frequency, to monitor or transmit non-PS related sidelink discovery announcements on one or more frequencies or to monitor or transmit PS related sidelink discovery announcements on a specific frequency, but only if the UE is authorised to perform these particular ProSe related sidelink activities.

NOTE 2: It is up to UE implementation which actions to take (e.g. termination of unicast services, detach) when it is unable to perform the desired sidelink activities, e.g. due to UE capability limitations.

Sidelink communication consists of one-to-many and one-to-one sidelink communication. One-to-many sidelink communication consists of relay related and non-relay related one-to-many sidelink communication. One-to-one sidelink communication consists of relay related and non-relay related one-to-one sidelink communication. In relay related one-to-one sidelink communication the communicating parties consist of one sidelink relay UE and one sidelink remote UE.

Sidelink discovery consists of public safety related (PS related) and non-PS related sidelink discovery. PS related sidelink discovery consists of relay related and non-relay related PS related sidelink discovery. Upper layers indicate to RRC whether a particular sidelink announcement is PS related or non-PS related.

Upper layers indicate to RRC whether a particular sidelink procedure is V2X related or not.

The specification covers the use of UE to network sidelink relays by specifying the additional requirements that apply for a sidelink relay UE and a sidelink remote UE. I.e. for such UEs the regular sidelink UE requirements equally apply unless explicitly stated otherwise.

[ . . . ]

5.10.1d Conditions for V2X Sidelink Communication Operation

When it is specified that the UE shall perform V2X sidelink communication operation only if the conditions defined in this section are met, the UE shall perform V2X sidelink communication operation only if:

1> if the UE's serving cell is suitable (RRC_IDLE or RRC_CONNECTED); and if either the selected cell on the frequency used for V2X sidelink communication operation belongs to the registered or equivalent PLMN as specified in TS 24.334 [69] or the UE is out of coverage on the frequency used for V2X sidelink communication operation as defined in TS 36.304 [4, 11.4]; or 1> if the UE's serving cell (for RRC_IDLE or RRC_CONNECTED) fulfils the conditions to support V2X sidelink communication in limited service state as specified in TS 23.285 [78, 4.4.8]; and if either the serving cell is on the frequency used for V2X sidelink communication operation or the UE is out of coverage on the frequency used for V2X sidelink communication operation as defined in TS 36.304 [4, 11.4]; or 1> if the UE has no serving cell (RRC_IDLE);

5.10.2 Sidelink UE Information 5.10.2.1 General

Figure 13:
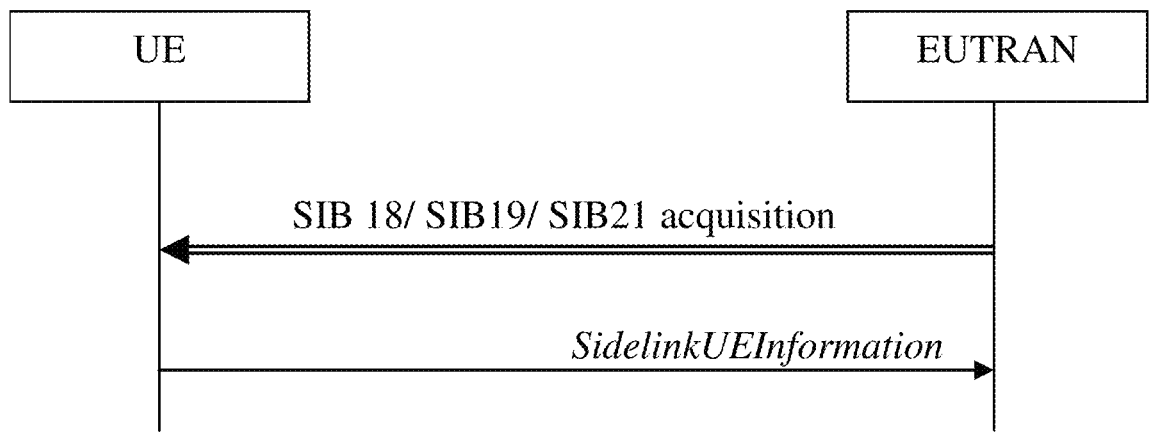
FIG. 13 is a reproduction of FIG. 5.10.2-1 of 3GPP TS 36.331 V15.1.0.

[FIG. 5.10.2-1 of 3GPP TS 36.331 V15.1.0, entitled "Sidelink UE information", is reproduced as FIG. 13]

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon does not include the resources for transmission (in normal conditions), initiates connection establishment in accordance with 5.3.3.1a.

Upon initiating the procedure, the UE shall:

[ . . . ]

parameters and stop T370;

1> if SystemInformationBlockType21 including sl-V2X-ConfigCommon is broadcast by the PCell:

2> ensure having a valid version of SystemInformationBlockType21 for the PCell;

2> if configured by upper layers to receive V2X sidelink communication on a primary frequency or on one or more frequencies included in v2x-InterFreqInfoList, if included in SystemInformationBlockType21 of the PCell:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType21 including sl-V2X-ConfigCommon; or 3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:

4> initiate transmission of the SidelinkUEInformation message to indicate the V2X sidelink communication reception frequency(ies) of interest in accordance with 5.10.2.3;

2> else:

3> if the last transmission of the SidelinkUEInformation message included v2x-CommRxInterestedFreqList:

4> initiate transmission of the SidelinkUEInformation message to indicate it is no longer interested in V2X sidelink communication reception in accordance with 5.10.2.3;

2> if configured by upper layers to transmit V2X sidelink communication on a primary frequency or on one or more frequencies included in v2x-InterFreqInfoList, if included in SystemInformationBlockType21 of the PCell:

3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType21 including sl-V2X-ConfigCommon; or 3> if the last transmission of the SidelinkUEInformation message did not include v2x-CommTxResourceReq; or if the information carried by the v2x-CommTxResourceReq has changed since the last transmission of the SidelinkUEInformation message:
- 4> initiate transmission of the SidelinkUEInformation message to indicate the V2X sidelink communication transmission resources required by the UE in accordance with 5.10.2.3;
- 2> else:
  - 3> if the last transmission of the SidelinkUEInformation message included v2x-CommTxResourceReq:
    - 4> initiate transmission of the SidelinkUEInformation message to indicate it no longer requires V2X sidelink communication transmission resources in accordance with 5.10.2.3;

5.10.2.3 Actions Related to Transmission of SidelinkUEInformation Message

The UE shall set the contents of the SidelinkUEInformation message as follows:
- 1> if the UE initiates the procedure to indicate it is (no more) interested to receive sidelink communication or discovery or receive V2X sidelink communication or to request (configuration/release) of sidelink communication or V2X sidelink communication or sidelink discovery transmission resources (i.e. UE includes all concerned information, irrespective of what triggered the procedure):
  - [ . . . ]
  - 2> if SystemInformationBlockType21 is broadcast by the PCell and SystemInformationBlockType21 includes sl-V2X-ConfigCommon:
    - 3> if configured by upper layers to receive V2X sidelink communication:
      - 4> include v2x-CommRxInterestedFreqList and set it to the frequency(ies) for V2X sidelink communication reception;
    - 3> if configured by upper layers to transmit V2X sidelink communication:
      - 4> if configured by upper layers to transmit P2X related V2X sidelink communication:
        - 5> include p2x-CommTxType set to true;
      - 4> include v2x-CommTxResourceReq and set its fields as follows for each frequency on which the UE is configured for V2X sidelink communication transmission:
        - 5> set carrierFreqCommTx to indicate the frequency for V2X sidelink communication transmission;
        - 5> set v2x-TypeTxSync to the current synchronization reference type used on the associated carrierFreqCommTx for V2X sidelink communication transmission;
        - 5> set v2x-DestinationInfoList to include the V2X sidelink communication transmission destination(s) for which it requests E-UTRAN to assign dedicated resources;
  - [ . . . ]

The UE shall submit the SidelinkUEInformation message to lower layers for transmission.
[ . . . ]

5.10.12 V2X Sidelink Communication Monitoring

A UE capable of V2X sidelink communication that is configured by upper layers to receive V2X sidelink communication shall:
- 1> if the conditions for sidelink operation as defined in 5.10.1d are met:
  - 2> if in coverage on the frequency used for V2X sidelink communication, as defined in TS 36.304 [4, 11.4]:
    - 3> if the frequency used to receive V2X sidelink communication is included in v2x-InterFreqInfoList within RRCConnectionReconfiguration or in v2x-InterFreqInfoList within SystemInformationBlockType21 of the serving cell/Pcell, and v2x-CommRxPool is included in SL-V2X-InterFreqUE-Config within v2x-UE-ConfigList in the entry of v2x-InterFreqInfoList for the concerned frequency:
      - 4> configure lower layers to monitor sidelink control information and the corresponding data using the pool of resources indicated in v2x-CommRxPool;
    - 3> else:
      - 4> if the cell chosen for V2X sidelink communication reception broadcasts SystemInformationBlockType21 including v2x-CommRxPool in sl-V2X-ConfigCommon or,
      - 4> if the UE is configured with v2x-CommRxPool included in mobilityControlInfoV2X in RRCConnectionReconfiguration:
        - 5> configure lower layers to monitor sidelink control information and the corresponding data using the pool of resources indicated in v2x-CommRxPool;
  - 2> else (i.e. out of coverage on the frequency used for V2X sidelink communication, as defined in TS 36.304 [4, 11.4]):
    - 3> if the frequency used to receive V2X sidelink communication is included in v2x-InterFreqInfoList within RRCConnectionReconfiguration or in v2x-InterFreqInfoList within SystemInformationBlockType21 of the serving cell/PCell, and v2x-CommRxPool is included in SL-V2X-InterFreqUE-Config within v2x-UE-ConfigList in the entry of v2x-InterFreqInfoList for the concerned frequency:
      - 4> configure lower layers to monitor sidelink control information and the corresponding data using the pool of resources indicated in v2x-CommRxPool;
    - 3> else:
      - 4> configure lower layers to monitor sidelink control information and the corresponding data using the pool of resources that were preconfigured (i.e. v2x-CommRxPoolList in SL-V2X-Preconfiguration defined in 9.3);

5.10.13 V2X Sidelink Communication Transmission 5.10.13.1 Transmission of V2X Sidelink Communication A UE capable of V2X sidelink communication that is configured by upper layers to transmit V2X sidelink communication and has related data to be transmitted shall:
- 1> if the conditions for sidelink operation as defined in 5.10.1d are met:
  - 2> if in coverage on the frequency used for V2X sidelink communication as defined in TS 36.304 [4, 11.4]; or
  - 2> if the frequency used to transmit V2X sidelink communication is included in v2x-InterFreqInfoList in RRCConnectionReconfiguration or in v2x-InterFreqInfoList within SystemInformationBlockType21:
    - 3> if the UE is in RRC_CONNECTED and uses the PCell or the frequency included in v2x-Inter- FreqInfoList in RRCConnectionReconfiguration for V2X sidelink communication:
4> if the UE is configured, by the current PCell with commTxResources set to scheduled:
5> if T310 or T311 is running; and if the PCell at which the UE detected physical layer problems or radio link failure broadcasts SystemInformationBlockType21 including v2x-CommTxPoolExceptional in sl-V2X-ConfigCommon, or v2x-Comm TxPoolExceptional is included in v2x-InterFreqInfoList for the concerned frequency in SystemInformationBlockType21 or RRCConnectionReconfiguration; or
5> if T301 is running and the cell on which the UE initiated connection re-establishment broadcasts SystemInformationBlockType21 including v2x-CommTxPoolExceptional in sl-V2X-ConfigCommon, or v2x-Comm TxPoolExceptional is included in v2x-InterFreqInfoList for the concerned frequency in SystemInformationBlockType21; or
5> if T304 is running and the UE is configured with v2x-CommTxPoolExceptional included in mobilityControlInfoV2X in RRCConnectionReconfiguration or in v2x-InterFreqInfoList for the concerned frequency in RRCConnectionReconfiguration:
6> configure lower layers to transmit the sidelink control information and the corresponding data based on random selection using the pool of resources indicated by v2x-CommTxPoolExceptional as defined in TS 36.321 [6];
5> else:
6> configure lower layers to request E-UTRAN to assign transmission resources for V2X sidelink communication;
4> else if the UE is configured with v2x-CommTxPoolNormalDedicated or v2x-CommTxPoolNormal or p2x-CommTxPoolNormal in the entry of v2x-InterFreqInfoList for the concerned frequency in sl-V2X-ConfigDedicated in RRCConnectionReconfiguration:
5> if the UE is configured to transmit non-P2X related V2X sidelink communication and a result of sensing on the resources configured in v2x-Comm TxPoolNormalDedicated or v2x-CommTxPoolNormal in the entry of v2x-InterFreqInfoList for the concerned frequency in RRCConnectionReconfiguration is not available in accordance with TS 36.213 [23]; or
5> if the UE is configured to transmit P2X related V2X sidelink communication and selects to use partial sensing according to 5.10.13.1a, and a result of partial sensing on the resources configured in v2x-Comm TxPoolNormalDedicated or p2x-CommTxPoolNormal in the entry of v2x-InterFreqInfoList for the concerned frequency in RRCConnectionReconfiguration is not available in accordance with TS 36.213 [23]:
6> if v2x-CommTxPoolExceptional is included in mobilityControlInfoV2X in RRCConnectionReconfiguration (i.e., handover case); or
6> if v2x-CommTxPoolExceptional is included in the entry of v2x-InterFreqInfoList for the concerned frequency in RRCConnectionReconfiguration; or 6> if the PCell broadcasts SystemInformationBlockType21 including v2x-Comm TxPoolExceptional in sl-V2X-ConfigCommon or v2x-Comm TxPoolExceptional in v2x-InterFreqInfoList for the concerned frequency:
7> configure lower layers to transmit the sidelink control information and the corresponding data based on random selection using the pool of resources indicated by v2x-CommTxPoolExceptional as defined in TS 36.321 [6];
5> else if the UE is configured to transmit P2X related V2X sidelink communication:
6> select a resource pool according to 5.10.13.2;
6> perform P2X related V2X sidelink communication according to 5.10.13.1a;
5> else if the UE is configured to transmit non-P2X related V2X sidelink communication:
6> configure lower layers to transmit the sidelink control information and the corresponding data based on sensing (as defined in TS 36.321 [6] and TS 36.213 [23]) using one of the resource pools indicated by v2x-commTxPoolNormalDedicated or v2x-CommTxPoolNormal in the entry of v2x-InterFreqInfoList for the concerned frequency, which is selected according to 5.10.13.2;
3> else:
4> if the cell chosen for V2X sidelink communication transmission broadcasts SystemInformationBlockType21:
5> if the UE is configured to transmit non-P2X related V2X sidelink communication, and if SystemInformationBlockType21 includes v2x-Comm TxPoolNormalCommon or v2x-CommTxPoolNormal in v2x-InterFreqInfoList for the concerned frequency in sl-V2X-ConfigCommon and a result of sensing on the resources configured in v2x-CommTxPoolNormalCommon or v2x-CommTxPoolNormal in v2x-InterFreqInfoList for the concerned frequency is available in accordance with TS 36.213 [23]:
6> configure lower layers to transmit the sidelink control information and the corresponding data based on sensing (as defined in TS 36.321 [6] and TS 36.213 [23]) using one of the resource pools indicated by v2x-CommTxPoolNormalCommon or v2x-CommTxPoolNormal in v2x-InterFreqInfoList for the concerned frequency, which is selected according to 5.10.13.2;
5> else if the UE is configured to transmit P2X related V2X sidelink communication, and if SystemInformationBlockType21 includes p2x-Comm TxPoolNormalCommon or p2x-CommTxPoolNormal in v2x-InterFreqInfoList for the concerned frequency in sl-V2X-ConfigCommon, and if the UE selects to use random selection according to 5.10.13.1a, or selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency is available in accordance with TS 36.213 [23]:
6> select a resource pool from p2x-CommTxPoolNormalCommon or p2x-CommTxPoolNormal in v2x-InterFreqInfoList for the concerned frequency according to 5.10.13.2, but ignoring zoneConfig in SystemInformationBlockType21;

6> perform P2X related V2X sidelink communication according to 5.10.13.1a;

5> else if SystemInformationBlockType21 includes v2x-CommTxPoolExceptional in sl-V2X-ConfigCommon or v2x-CommTxPoolExceptional in v2x-InterFreqInfoList for the concerned frequency:

6> from the moment the UE initiates connection establishment until receiving an RRCConnectionReconfiguration including sl-V2X-ConfigDedicated, or until receiving an RRCConnectionRelease or an RRCConnectionReject; or 6> if the UE is in RRC_IDLE and a result of sensing on the resources configured in v2x-Comm TxPoolNormalCommon or v2x-CommTxPoolNormal in v2x-InterFreqInfoList for the concerned frequency in Systeminformationblocktype21 is not available in accordance with TS 36.213 [23]; or 6> if the UE is in RRC_IDLE and UE selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency in Systeminformationblocktype21 is not available in accordance with TS 36.213 [23]:

7> configure lower layers to transmit the sidelink control information and the corresponding data based on random selection (as defined in TS 36.321 [6]) using the pool of resources indicated in v2x-Comm TxPoolExceptional;

2> else:

3> configure lower layers to transmit the sidelink control information and the corresponding data based on sensing (as defined in TS 36.321 [6] and TS 36.213 [23]) using one of the resource pools indicated by v2x-CommTxPoolList in SL-V2X-Preconfiguration in case of non-P2X related V2X sidelink communication, which is selected according to 5.10.13.2, or using one of the resource pools indicated by p2x-CommTxPoolList in SL-V2X-Preconfiguration in case of P2X related V2X sidelink communication, which is selected according to 5.10.13.2, and in accordance with the timing of the selected reference as defined in 5.10.8;

The UE capable of non-P2X related V2X sidelink communication that is configured by upper layers to transmit V2X sidelink communication shall perform sensing on all pools of resources which may be used for transmission of the sidelink control information and the corresponding data. The pools of resources are indicated by SL-V2X-Preconfiguration, v2x-Comm TxPoolNormalCommon, v2x-CommTxPoolNormalDedicated in sl-V2X-ConfigDedicated, or v2x-CommTxPoolNormal in v2x-InterFreqInfoList for the concerned frequency, as configured above.

NOTE 1: If there are multiple frequencies for which normal or exceptional pools are configured, it is up to UE implementation which frequency is selected for V2X sidelink communication transmission.

3GPP TS 36.213 V15.1.0 describes a sensing procedure for determining whether resource is available as follows:

14.1.1.6 UE Procedure for Determining the Subset of Resources to be Reported to Higher Layers in PSSCH Resource Selection in Sidelink Transmission Mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1$≤4 and 20≤$T_2$≤100. UE selection of $T_2$ shall fulfil the latency requirement. The total number of the candidate single-subframe resources is denoted by $M_{total}$.

2) The UE shall monitor subframes n−1000, n−999, . . . , n−1 except for those in which its transmissions occur and for those not belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets y+j×$P'_{rsvp\_TX}$=z+$P_{step}$×k×q where j=0, 1, . . . , $C_{resel}$−1, $P'_{rsvp\_TX}$=$P_{step}$×$P_{rsvp\_TX}$/100, k is any value allowed by the higher layer parameter restrictResourceReservationPeriod and q=1, 2, . . . , Q. Here, $$Q = \frac{1}{k}$$

if k<1 and n'−z≤$P_{step}$×k, where $t_{n'}^{SL}$=n if subframe n belongs to the set $t_0^{SL}$, $t_1^{SL}$, . . . , $t_{T_{max}}^{SL}$, otherwise subframe $t_{n'}^{SL}$ is the first subframe belonging to the set $t_0^{SL}$, $t_1^{SL}$, . . . , $t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX}, prio_{RX}}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX} < 1$ and n'−m≤$P_{step} \times P_{rsvp\_RX}$, where $t_{n'}^{SL}$=n if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall determine by its implementation a set of subframes which consists of at least Y subframes within the time interval [n+$T_1$,n+$T_2$] where selections of $T_1$ and $T_2$ are up to UE implementations under $T_1 \leq 4$ and 20≤$T_2$≤100. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX}, prio_{RX}}$.

the SCI format received in subframe $t_m^{SL}$ or the same SCI format 1 which is assumed to be received in subframe(s) $t_{m+q \times P_{step} \times P'_{rsvp\_RX}}^{SL}$ determines according to 14.1.1.4C the set of resource blocks and subframes which overlaps with $R_{x,y+j \times P'_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX} < 1$ and y'−m≤$P_{step} \times P_{rsvp\_RX}$+$P_{step}$, where $t_y^{SL}$, is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

In the current V2X communication on D2D interface, there are generally two different resource allocation modes: mode 3 and mode 4. For mode 3, a UE will receive and follow network's scheduling to perform V2X transmission. In detail, a UE could be schedule through dynamic scheduling or through semi-persistent scheduling (SPS) on D2D interface. The dynamic scheduling is that network transmits a downlink control information (DCI) to a UE through an interface between UE and network (e.g. Uu interface) for scheduling a transmission (and retransmission(s)) on D2D interface (e.g. PC5). And the SPS is that network allocates periodic resource(s) to a UE through an interface between UE and network (e.g. Uu interface) for scheduling new transmission(s) (and retransmission(s)) on D2D interface (e.g. PC5) without transmitting downlink control information for every periodic resource. And the periodic resource or the resource scheduled in DCI will be part of resource(s) in a resource pool.

In general, the SPS could be allocated through one of following methods:

1. Network allocates the periodic resources through a SPS configuration (e.g. RRC configuration).
2. Network allocates the periodic resources through a DCI to activate resource in a SPS configuration (e.g. RRC configuration).

3. Network allocates the periodic resource through a DCI with resource to activate a SPS configuration (e.g. RRC configuration).

Figure 14:
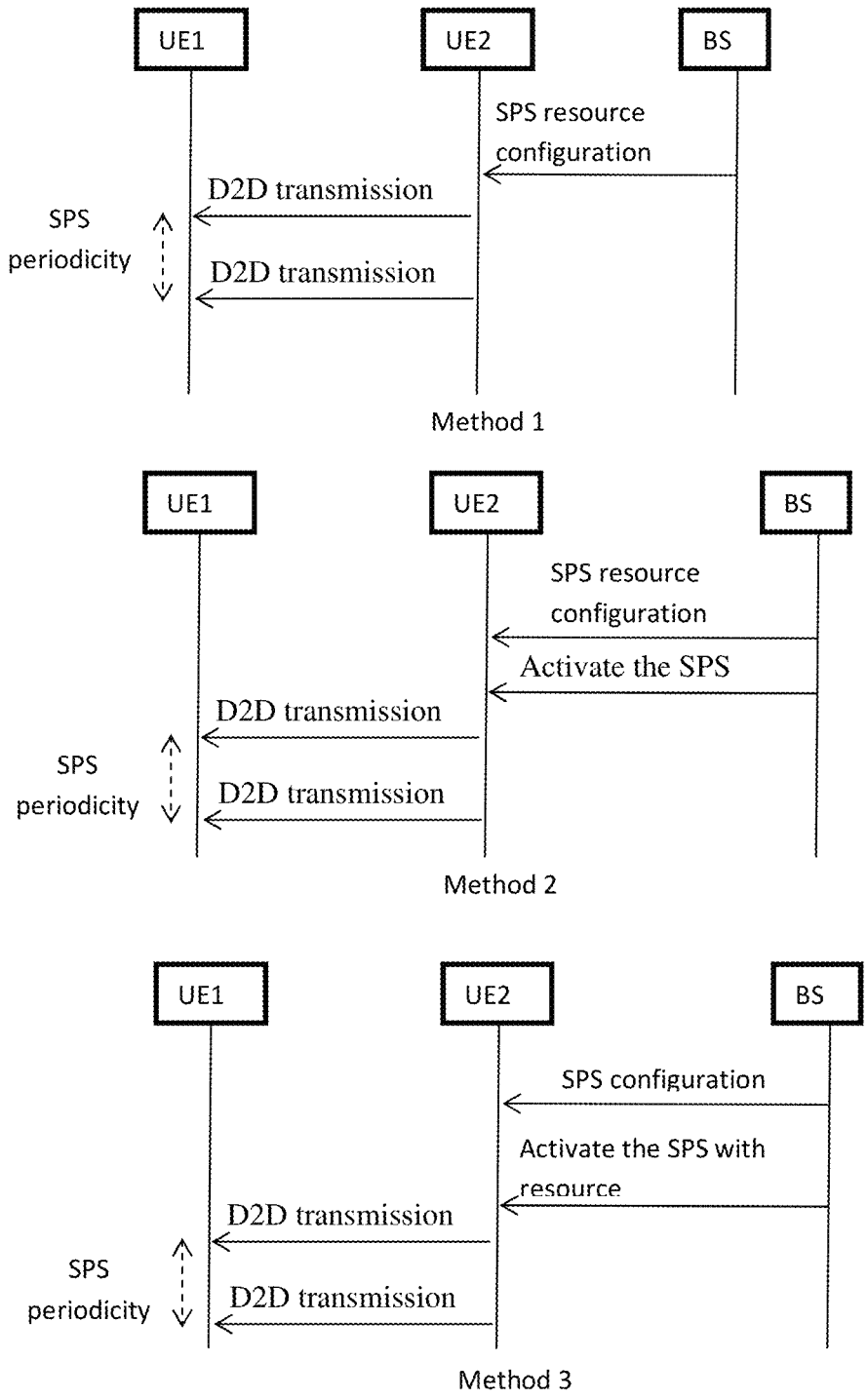
FIG. 14 is a diagram according to one exemplary embodiment.

Exemplary Semi-Persistent Schedule methods are shown in FIG. 14. For mode 4, a UE can select a (set of) resource from a resource pool for performing V2X transmission on D2D interface. The selected resource(s) could be for a single MAC PDU or for multiple MAC PDUs (e.g. SPS or SPS like). The selected resource for multiple PDUs is called configured sidelink grant corresponding to transmissions of multiple MAC PDUs. Specifically, a UE wants to perform V2X transmission may need to monitor the resource pool to find available resource set and randomly select resource from the available resource set. How to determine resource (s) in the resource pool belonging to available resource set is captured in 3GPP TS 36.213.

Figure 15:
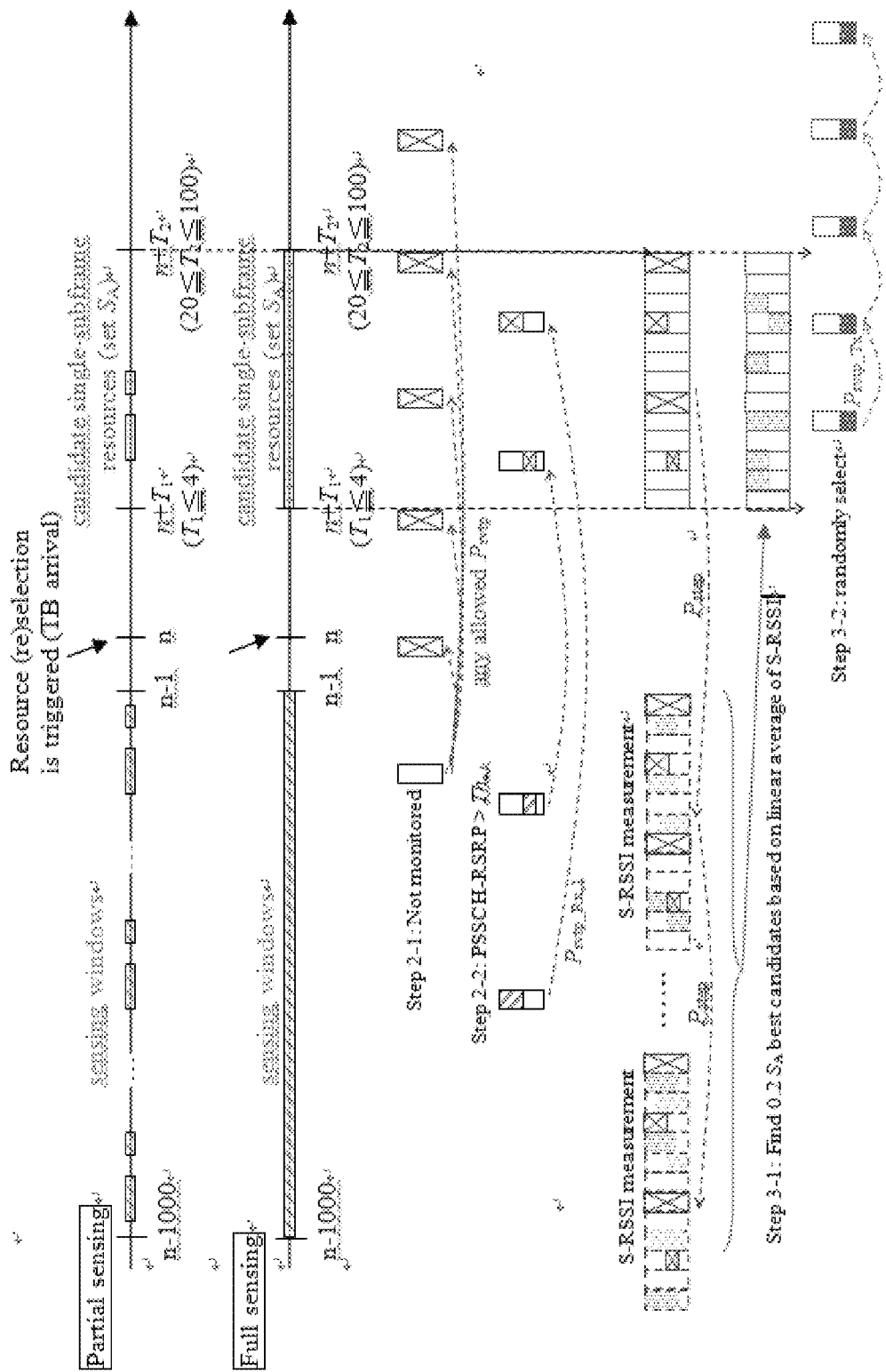
FIG. 15 is a diagram according to one exemplary embodiment.

An example for how to determine available resource set is shown in FIG. 15. In FIG. 15, a UE will need to determine available resource set based on steps. In step 2-1, a (V2X) UE will need to preclude resources which the UE did not monitor. The resources based on possible periodicities should also be precluded as blocks with cross in the figure. In step 2-2, a UE will preclude resource based on received SCI. The SCI will indicate whether the resource will be reserved with certain periodicity. The UE will preclude resource based on such information. In step 3-1, the UE will preclude resource with stronger power sensing result. The sensing result is determined based on 1 second monitoring and average calculation of power measurement. In this step, the UE will select resources with smaller metric of linear average S-RSSI measurement, wherein at least 20% of total resources are selected as candidate resources. In step 3-2, the UE randomly selects resource from the candidate resources. The detail of each step could be found in 3GPP TS 36.213. The detail could refer to 3GPP TS 36.321.

Figure 16:
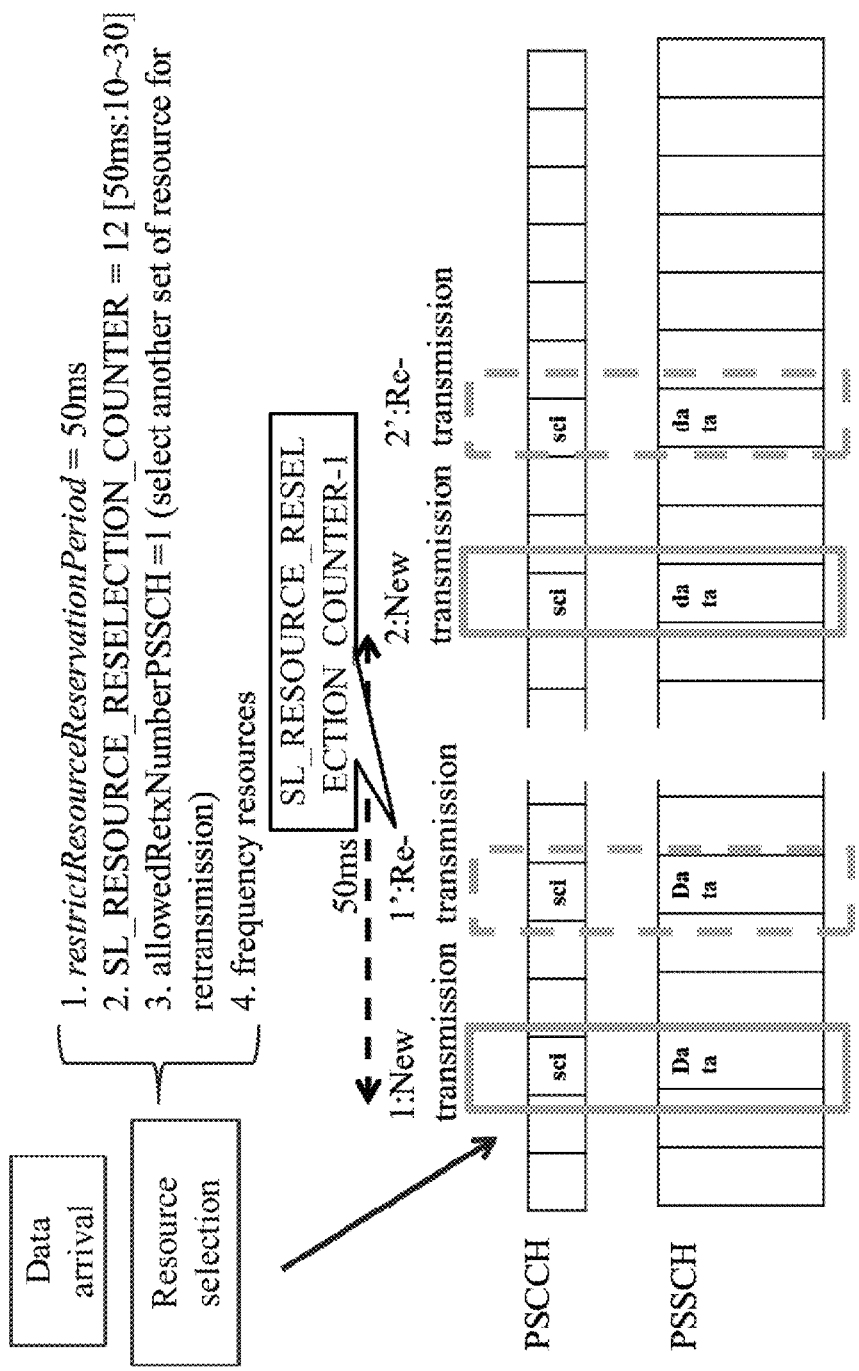
FIG. 16 is a diagram according to one exemplary embodiment.

An example for how to select parameters is shown in FIG. 16. In one step for determining available resource set, a UE using mode 4 will need to receive SCI and corresponding data transmission. The UE will determine available resource set based on reservation period information in SCI. The reservation period information is used for helping receiving UE to predict resource occupation. For example, a D2D transmitter sends a SCI and a corresponding data transmission on D2D interface. The SCI will carry information for indicating UE how to receive the corresponding data transmission. Moreover, the SCI will carry reservation period information for informing receiving UE that whether there will be another transmission on same resource (frequency domain) after an interval indicated by reservation period information. An example is shown in FIG. 17.

Figure 17:
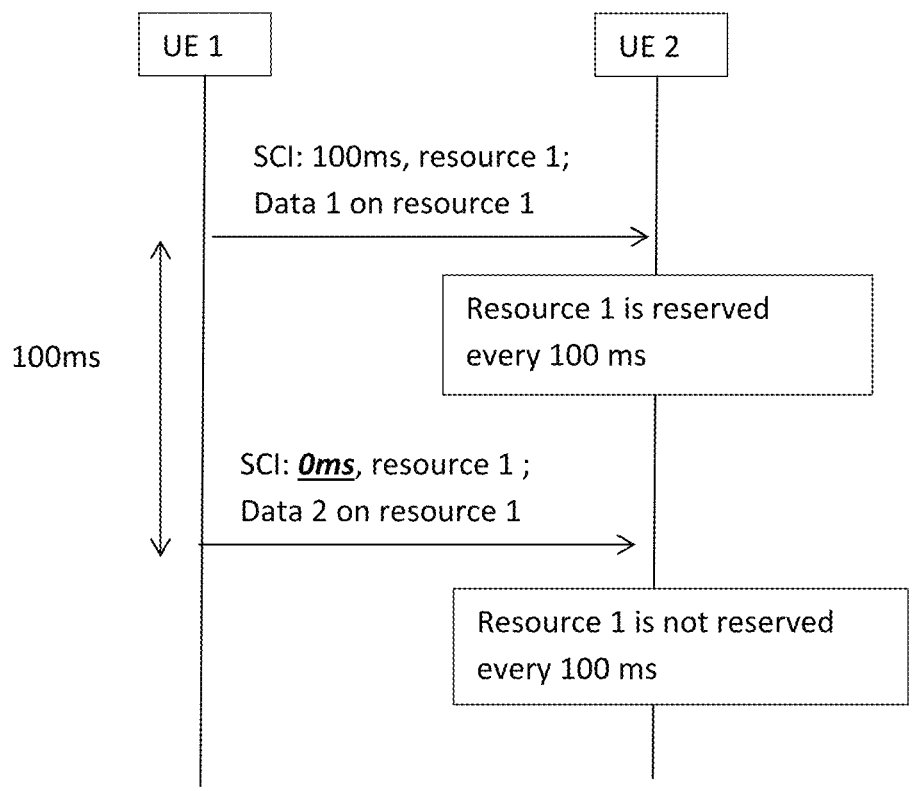
FIG. 17 is a diagram according to one exemplary embodiment.

In the example shown in FIG. 17, the UE1 transmits a SCI indicating resource reservation interval equal to 100 ms. After the UE2 receives the SCI, the UE2 will consider same resource in 100 ms later as not available. In the same example, the UE1 transmits a SCI indicating resource reservation interval equal to 0 ms. After the UE2 receives the SCI, the UE2 may consider same resource in 100 ms later as available. In addition, the UE2 may need to take extra step(s) for determining the same resource in 100 ms later as available. The extra step(s) could be step 3-1 shown in FIG. 15.

In a new discussion, for resource efficiency, it is possible that mode 3 and mode 4 resource allocation occur in same resource pool. Since mode 4 will need reservation period information to predict resource occupation, the UE configured with mode 3 will also need to transmit SCI with reservation period information. The UE will set reservation period information to 0 ms for dynamic scheduling and will set reservation period information to periodicity of SPS for SPS case.

Considering the SPS case, an issue of reservation period information is observed. Currently, the SPS activation/de-activation/release/configure are controlled by network. When the UE is allocated with a SPS (SPS is configured and/or activated), the UE will perform SCI and corresponding data transmission based on the SPS. However, in some cases, the UE could not reflect reservation period information to other receiving UE in current design. If the UE with SPS cannot reflect correct reservation period information to other UEs, the receiving UE configured with mode 4 cannot precisely determine available resource set.

Figure 18:
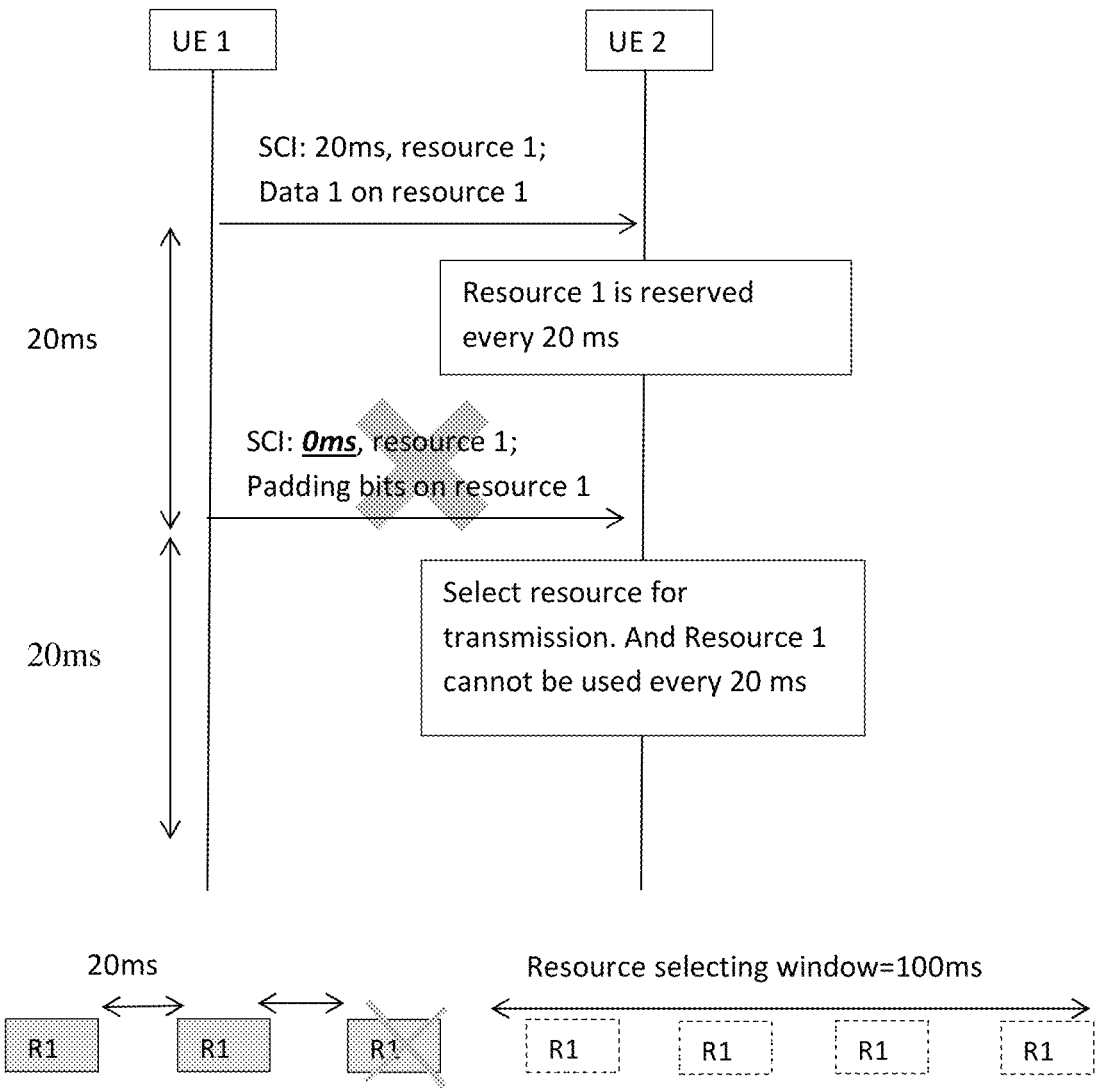
FIG. 18 is a diagram according to one exemplary embodiment.

One possible case is that no data available for transmission. If a UE does not have data available for transmission in one (new) transmission opportunity of the SPS, the UE will not perform both SCI transmission and data transmission based on the transmission opportunity. In this case, other receiving UE cannot receive SCI and may determine same resource as available in next time. A possible example is shown in FIG. 18. In the example shown in FIG. 18, the UE1 transmits V2X message every 20 ms and the UE2 can receive the V2X message. When the UE1 has no data and doesn't want to use the reserved resource, the UE1 will not perform V2X transmission and will not indicate the reserved resource release. The case usually occurs, when the UE1 selects resource more than its need based on random selection rule. And the UE2 cannot know the UE1 wishes to release the resource. If the UE2 wishes to perform transmission, the UE2 will need to prevent possible collision and will not select resource1 (R1) for every 20 ms in the resource selecting window.

Figure 19:
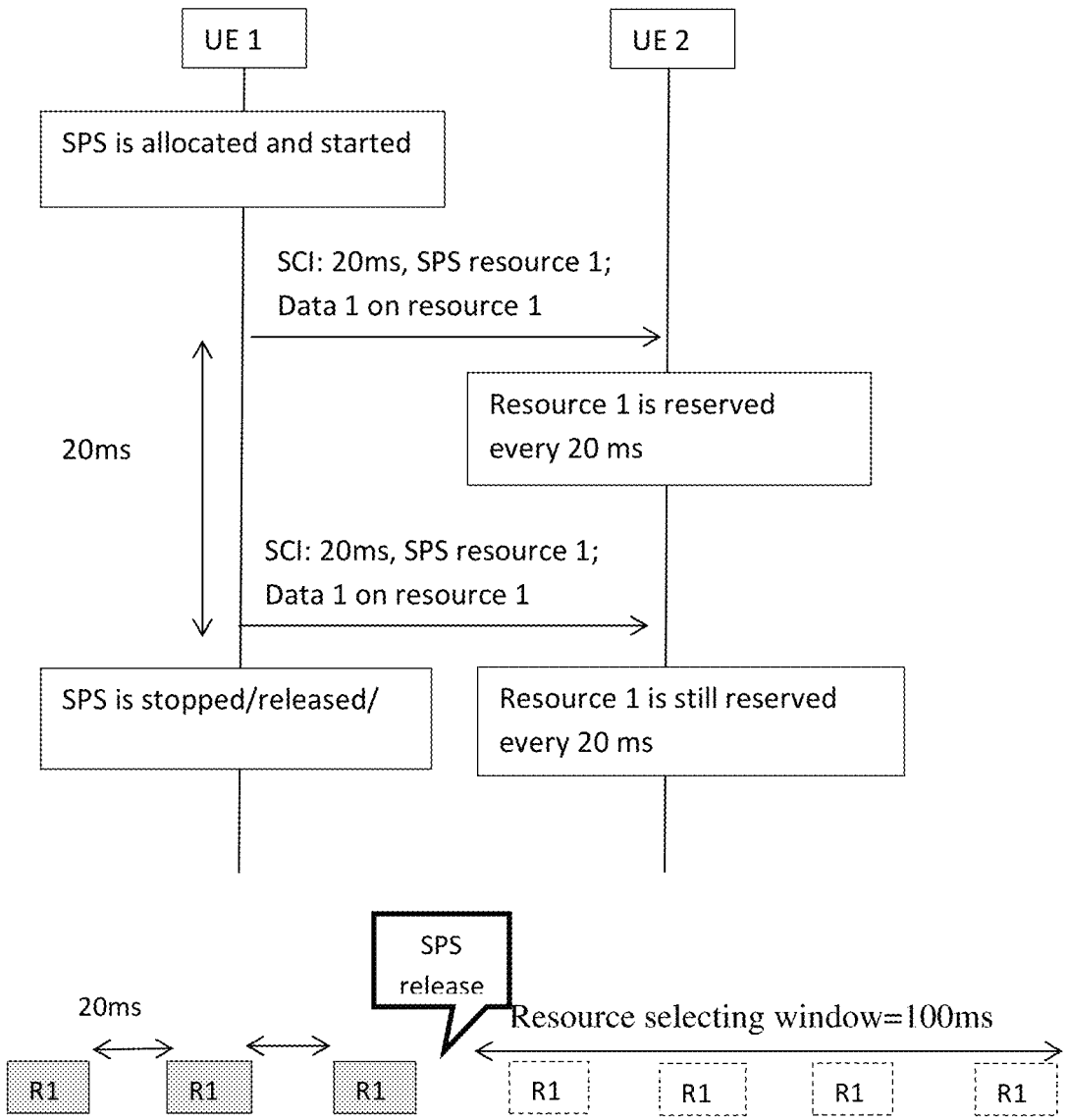
FIG. 19 is a diagram according to one exemplary embodiment.

Another possible case is that SPS release. If a UE receives a SPS release or autonomously release based on condition (s), the UE will stop performing both SCI transmission and data transmission immediately. In this case, other receiving UE cannot receive following possible SCI(s) and may determine same resource as not available in resource selection interval. A possible example is shown in FIG. 19. The UE1 in mode 3 will stop SPS immediately for receiving network's control signal/configuration. And the UE2 in mode 4 cannot know the SPS release/suspension.

The main benefit could be introduced for SPS periodicity less than resource selection interval. For enhancing the issue, we propose some possible solutions in below.

Figure 20:
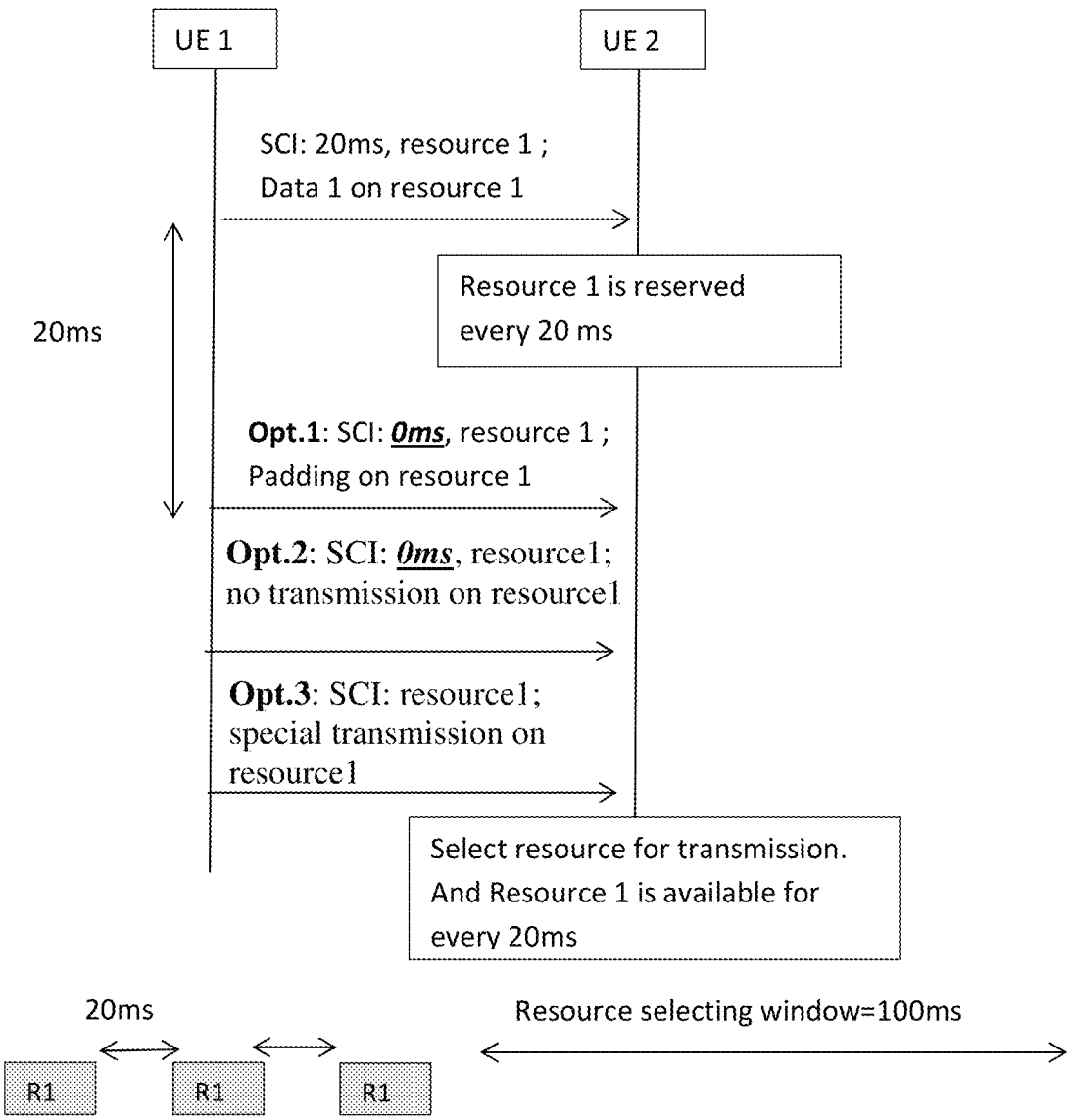
FIG. 20 is a diagram according to one exemplary embodiment.

Solution 1: Transmitting SCI with Correct Reservation Period Information Those Cases For no data available case, a UE could still transmit a SCI with reservation period information, instead of skipping the transmission opportunity. A value of the reservation period information could be determined based on whether the UE will keep using the resource. In addition, the UE could not perform corresponding data transmission for the SCI. For example in FIG. 20, the UE will perform a transmission even if the UE has no data. The transmission could be for indicating release of resource reservation. The transmission could be one or multiple SCI(s) only. The transmission could be one or multiple SCI(s) and corresponding data transmission(s).

In one embodiment, the data transmission(s) could include padding and/or control information (e.g. MAC CE). The data transmission(s) (e.g. MAC CE, RRC message, PDCP control message) could include special information for indicating release of resource reservation or traffic release or suspension. The SCI(s) could indicate the transmission is last transmission based on the reserved resource.

In one embodiment, the SCI(s) indication could be that a reservation period equals to 0 ms.

For SPS release case, a UE could perform a SCI transmission with reservation period information set to 0 ms. For network update SPS case (e.g. reconfiguration, release), the UE could perform the SCI transmission in the next (configured) transmission opportunity, after the UE receive the update signal (e.g. DCI scrambled with SPS-RNTI/SPS-V-RNTI, RRC reconfiguration) from the network (e.g. base station/cell/SpCell).

Figure 21:
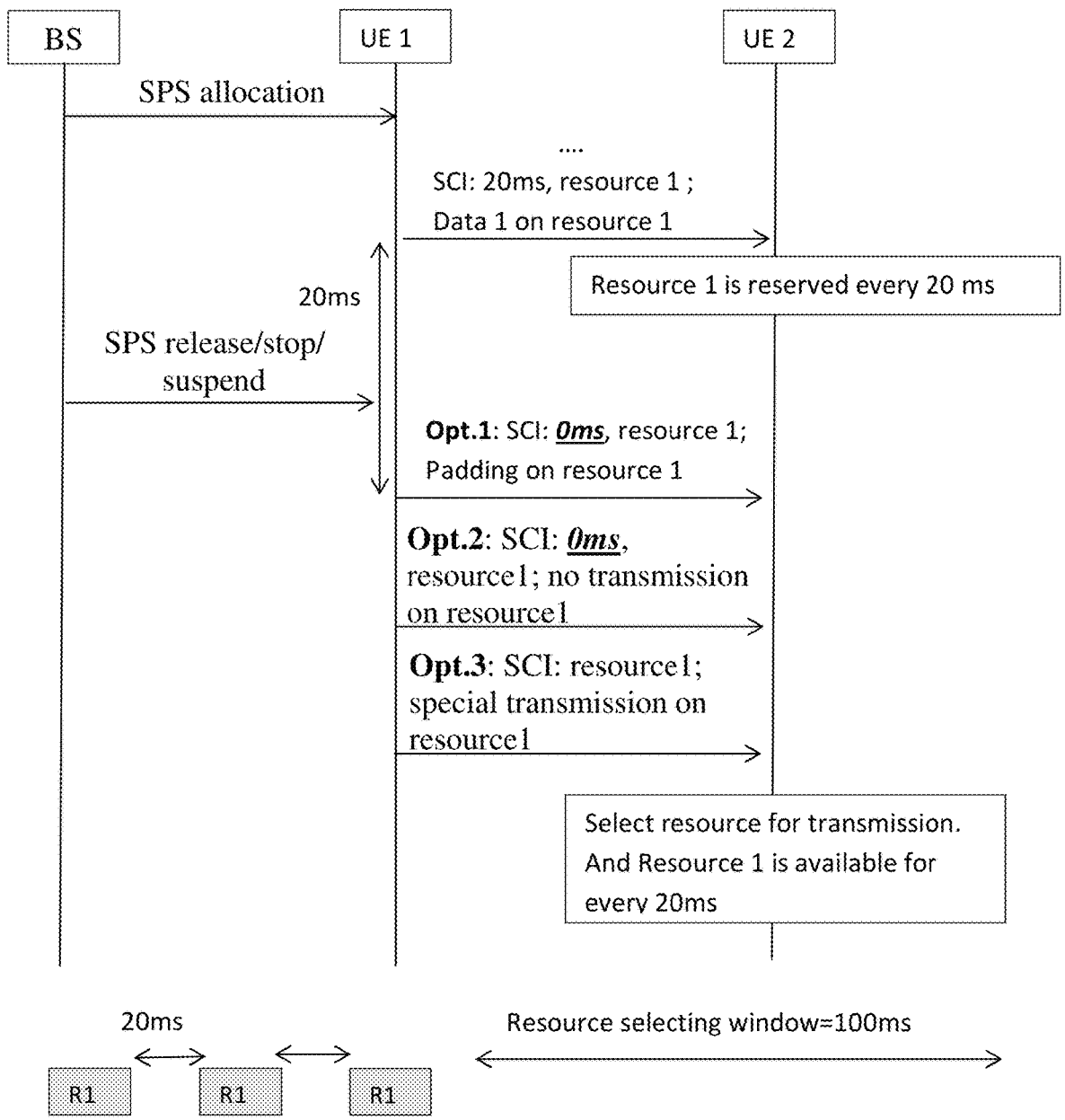
FIG. 21 is a diagram according to one exemplary embodiment.

An example is shown in FIG. 21. In FIG. 21, the UE1 receives SPS allocation and perform V2X transmission(s) based on the SPS configuration. The UE2 receives the V2X transmission(s) and determines the resource1 being reserved. When the UE1 receives a SPS release/stop/suspend command from the network (e.g. base station, cell, PCell, SpCell), the UE 1 will not immediately stop using the SPS resource configuration, but perform a (last) transmission to indicate release of resource reservation. The transmission could be one or multiple SCI(s) only. The transmission could be one or multiple SCI(s) and corresponding data transmission(s).

In one embodiment, the data transmission(s) could include padding and/or control information (e.g. MAC CE). The data transmission(s) (e.g. MAC CE, RRC message, PDCP control message) could also include special information for indicating release of resource reservation or traffic release/suspension. The SCI(s) could indicate the transmission is last transmission based on the reserved resource. In one embodiment, the SCI(s) indication could be that reservation period equal to 0 ms.

For UE autonomously release case, if a UE releases the SPS based on transmission time counter or a timer, the UE performs the SCI transmission at last available transmission opportunity determined by the transmission timer counter or the timer. For UE assistance case, a UE will need to transmit a traffic pattern change information or a SPS change suggestion to the network. The network will update SPS status/configuration based on UE's assistance. The UE could perform the SCI transmission for a SPS if the UE transmit or is going to transmit the traffic pattern change information or the SPS change suggestion, which indicating a traffic pattern related to the SPS is stopped or change or suggesting the SPS should be released.

Figure 22:
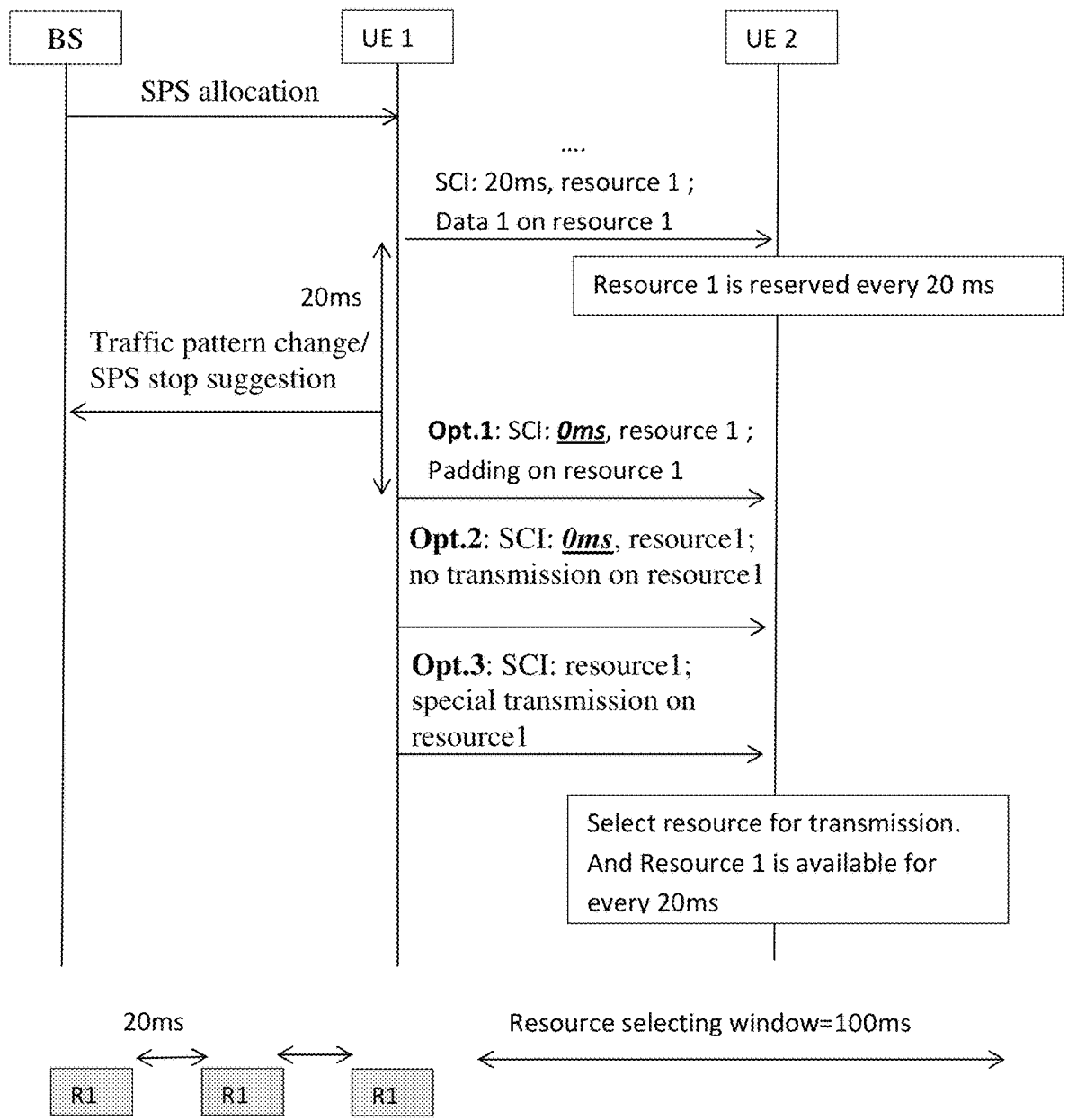
FIG. 22 is a diagram according to one exemplary embodiment.

A possible example is shown in FIG. 22. In the example, the UE already know the UE has no data arrival for the SPS and the SPS is not needed. The UE could directly perform a transmission to indicate release of resource reservation. The transmission could be one or multiple SCI(s) only. The transmission could be one or multiple SCI(s) and corresponding data transmission(s). In one embodiment, the data transmission(s) could include padding and/or control information (e.g. MAC CE). The data transmission(s) (e.g. MAC CE, RRC message, PDCP control message) could also include special information for indicating release of resource reservation or traffic release/suspension. The SCI(s) could indicate the transmission is last transmission based on the reserved resource. The SCI(s) indication could be that reservation period equal to 0 ms.

Solution 2: Transmitting SCI with Resource Reservation Times (e.g. how Many Times UE would Use for Performing Transmission)

A UE transmits a SCI including a field for indicating how long the UE could keep the same resource. Once the UE receives the SCI, the receiving UE could determine whether a resource indicated in the SCI is reserved based on the field. In one embodiment, the SCI could have a field for indicating reservation period information. The field for indicating reservation period information could be same as or different from the field for indicating reservation times.

For mode 3, the network could allocate the reservation times in the SPS configuration. In one embodiment, the UE could suspend or stop using the SPS configuration when the UE reach the reservation times. Alternatively, the network may not allocate the reservation times in the SPS configuration. A UE could fill a special value in the field. The special value could be non-zero value. The special value filled in the field could indicate that the resource is SPS resource allocated by the network.

For mode 4, the UE will fill a random selected value into the field for indicate resource reservation times.

The above solutions could be applied on P2X communication and/or D2D communication.

Figure 23:
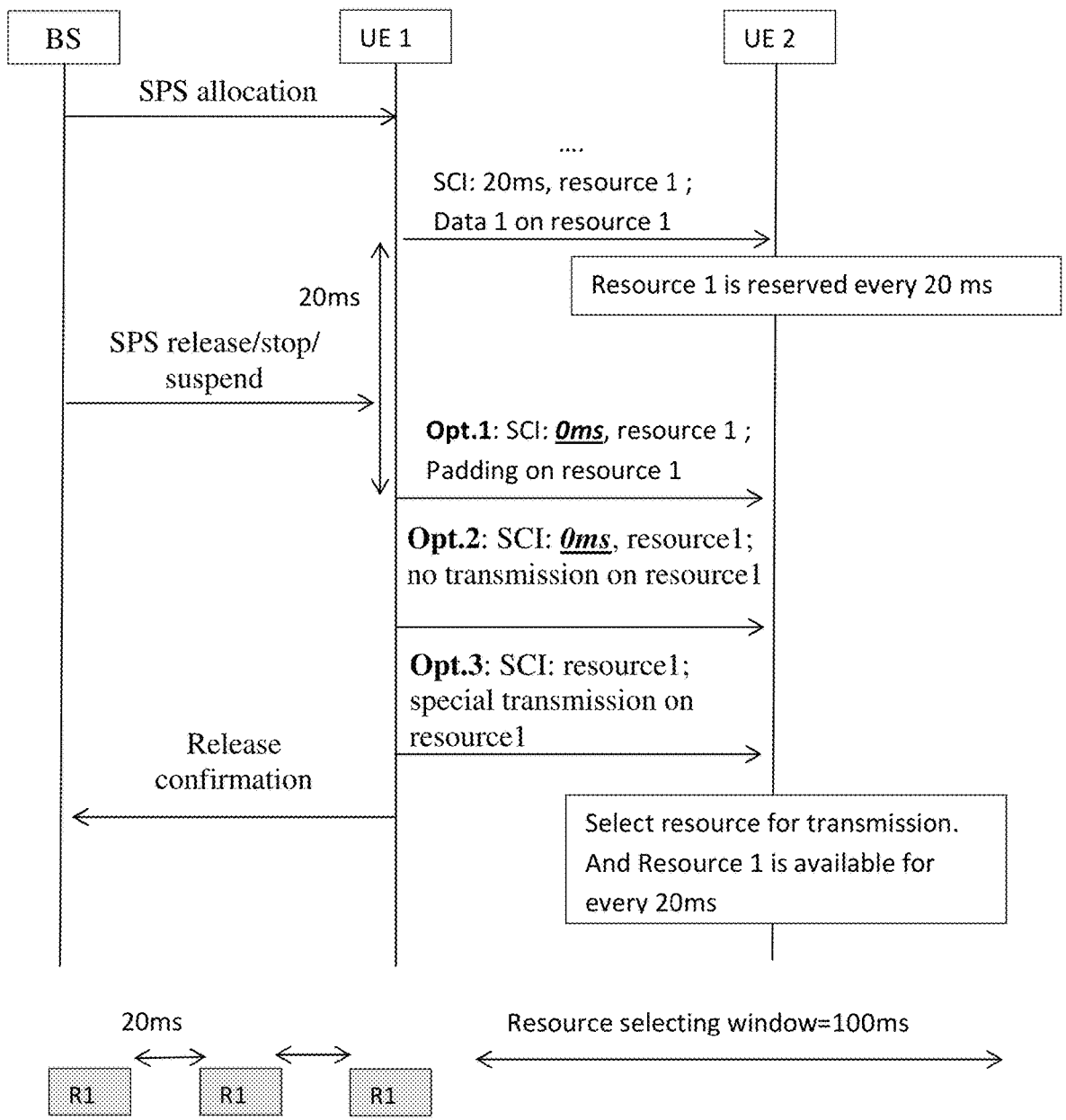
FIG. 23 is a diagram according to one exemplary embodiment.

Regarding sidelink SPS release, a UE may also need to reply a confirmation to the base station for reception of the release to the base station as shown in FIG. 23. The main reason is that the base station is not the receiving side and cannot know whether the sidelink SPS is still used.

Figure 24:
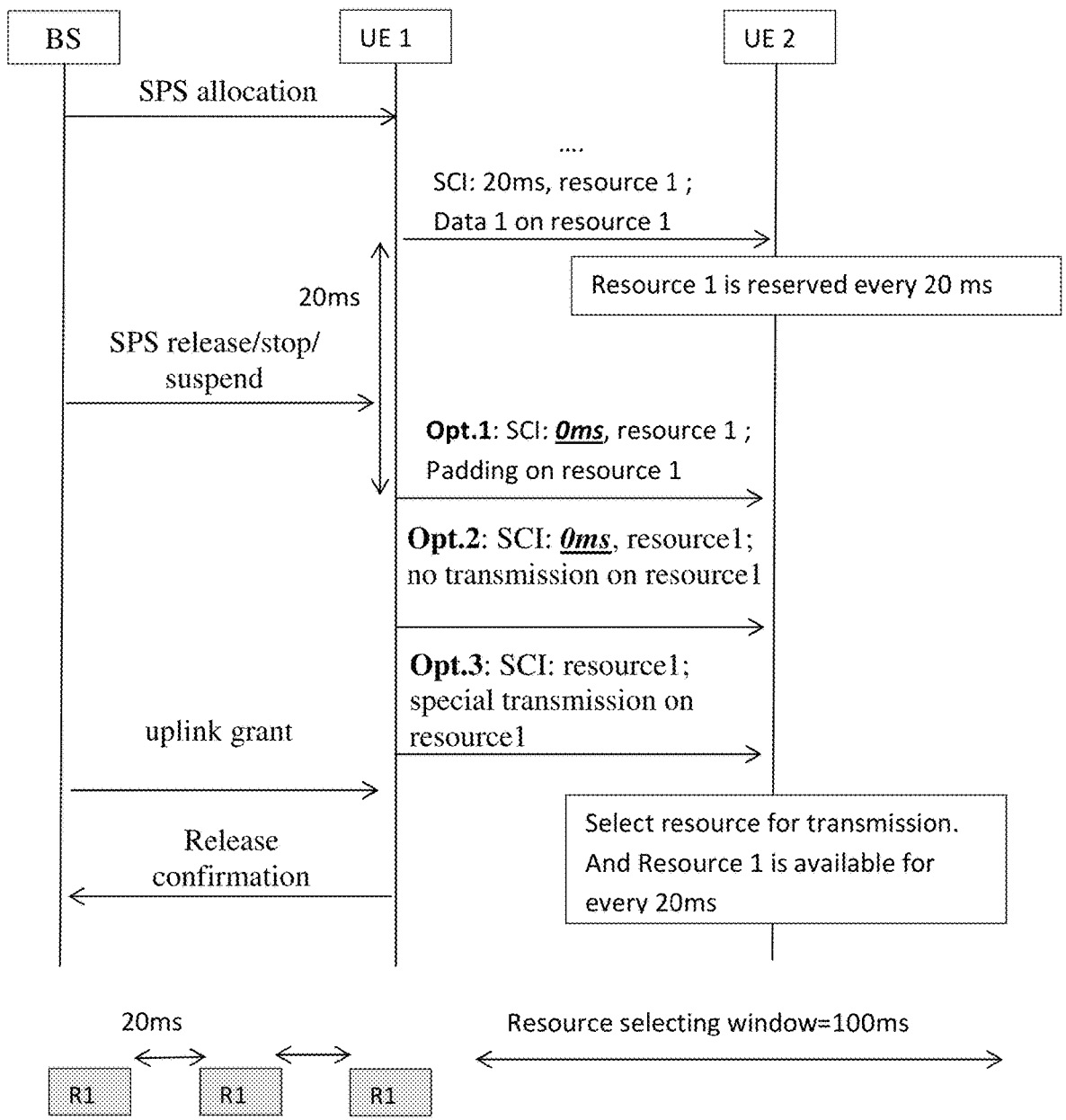
FIG. 24 is a diagram according to one exemplary embodiment.

In one embodiment, the UE could trigger a scheduling procedure (e.g. Scheduling request procedure, random access procedure) to obtain uplink grant for transmitting the confirmation. Alternatively, the UE could always wait for the base station scheduling instead of triggering the scheduling procedure. Since the release is from the base station, the base station could provide a following uplink grant for the confirmation. In FIG. 24, a possible example is shown. In addition, if the UE releases the sidelink SPS based on its determination (e.g. one or multiple times padding transmission or skipping transmissions), the UE could release the sidelink SPS and still trigger the scheduling procedure for the confirmation.

Figure 25:
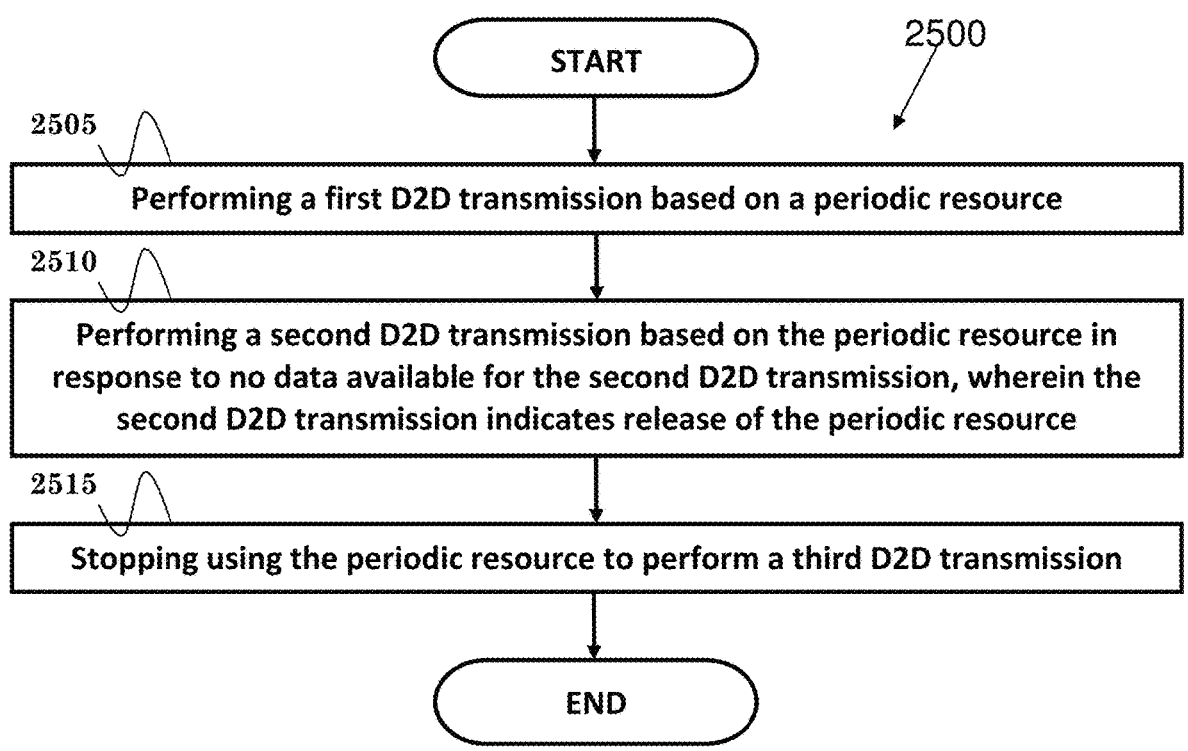
FIG. 25 is a flow chart according to one exemplary embodiment.

FIG. 25 is a flow chart 2500 according to one exemplary embodiment from the perspective of a UE. In step 2505, the UE performs a first device-to-device (D2D) transmission based on a periodic resource. In step 2510, the UE performs a second D2D transmission based on the periodic resource in response to no data available for the second D2D transmission, wherein the second D2D transmission indicates release of the periodic resource. In step 2515, the UE stops using the periodic resource to perform a third D2D transmission.

In one embodiment, the first D2D transmission includes a first sidelink control information. The first sidelink control information could include a field indicating reservation period equal to a non-zero value.

In one embodiment, the first D2D transmission could include a first sidelink data transmission. The first sidelink data transmission could include at least one MAC (Medium Access Control) SDU (Service Data Unit).

In one embodiment, the second D2D transmission could include a second sidelink control information. The second sidelink control information could include a field indicating reservation period equal to a special value (e.g. zero). The second sidelink control information could also include a field indicating the periodic resource release.

In one embodiment, the second D2D transmission includes a second sidelink data transmission. The second sidelink data transmission could include a MAC CE (Control Element) indicating the release of the periodic resource or includes padding bits and no MAC SDU.

In one embodiment, the periodic resource could be a configured sidelink grant corresponding to transmissions of multiple MAC PDUs (Protocol Data Units), and could be selected by the UE or allocated by a base station. The periodic resource could be provided by a base station.

Referring back to FIGS. 3 and 4, in one exemplary embodiment of a UE, the device 300 includes a program code 312 stored in the memory 310. The CPU 308 could execute program code 312 to enable the UE (i) to perform a first D2D transmission based on a periodic resource, (ii) to perform a second D2D transmission based on the periodic resource in response to no data available for the second D2D transmission, wherein the second D2D transmission indicates release of the periodic resource, and (iii) to stop using the periodic resource to perform a third D2D transmission. Furthermore, the CPU 308 can execute the program code 312 to perform all of the above-described actions and steps or others described herein.

Figure 26:
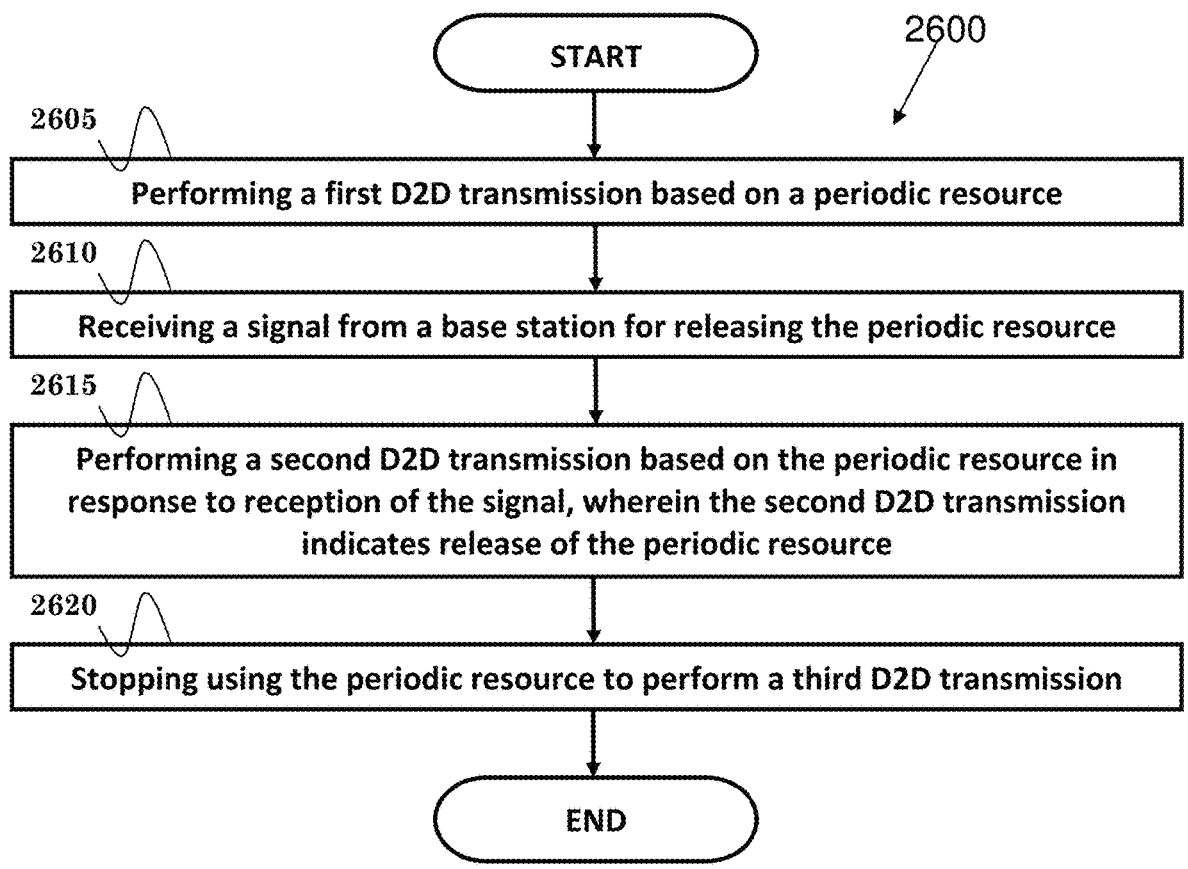
FIG. 26 is a flow chart according to one exemplary embodiment.

FIG. 26 is a flow chart 2600 according to one exemplary embodiment from the perspective of a UE. In step 2605, the UE performs a first D2D transmission based on a periodic resource. In step 2610, the UE receives a signal from a base station for releasing the periodic resource. In step 2615, the UE performs a second D2D transmission based on the periodic resource in response to reception of the signal, wherein the second D2D transmission indicates release of the periodic resource. In step 2620, the UE stops using the periodic resource to perform a third D2D transmission.

In one embodiment, the UE could perform a SPS (Semi-Persistent Scheduling) confirmation transmission to the base station in response to reception of the signal. The signal could be a PDCCH (Physical Downlink Control Channel) signal, MAC CE, or RRC message (e.g. RRC reconfiguration message). The signal could also be a DCI (Downlink Control Information) or a PDCCH signal scrambled with D2D-CS RNTI (D2D-Configured Scheduling-Radio Network Temporary Identifier). Furthermore, the signal could be a DCI (Downlink Control Information), a PDCCH signal, or a RRC (Radio Resource Control) message for bandwidth part switching or bandwidth part change.

In one embodiment, the periodic resource could be a configured sidelink grant corresponding to transmissions of multiple MAC PDUs (Protocol Data Units), and could be allocated by the base station.

Referring back to FIGS. 3 and 4, in one exemplary embodiment of a UE, the device 300 includes a program code 312 stored in the memory 310. The CPU 308 could execute program code 312 to enable the UE (i) to perform a first D2D transmission based on a periodic resource, (ii) to receive a signal from a base station for releasing the periodic resource, (iii) to perform a second D2D transmission based on the periodic resource in response to reception of the signal, wherein the second D2D transmission indicates release of the periodic resource, and (iv) to stop using the periodic resource to perform a third D2D transmission. Furthermore, the CPU 308 can execute the program code 312 to perform all of the above-described actions and steps or others described herein.

Figure 27:
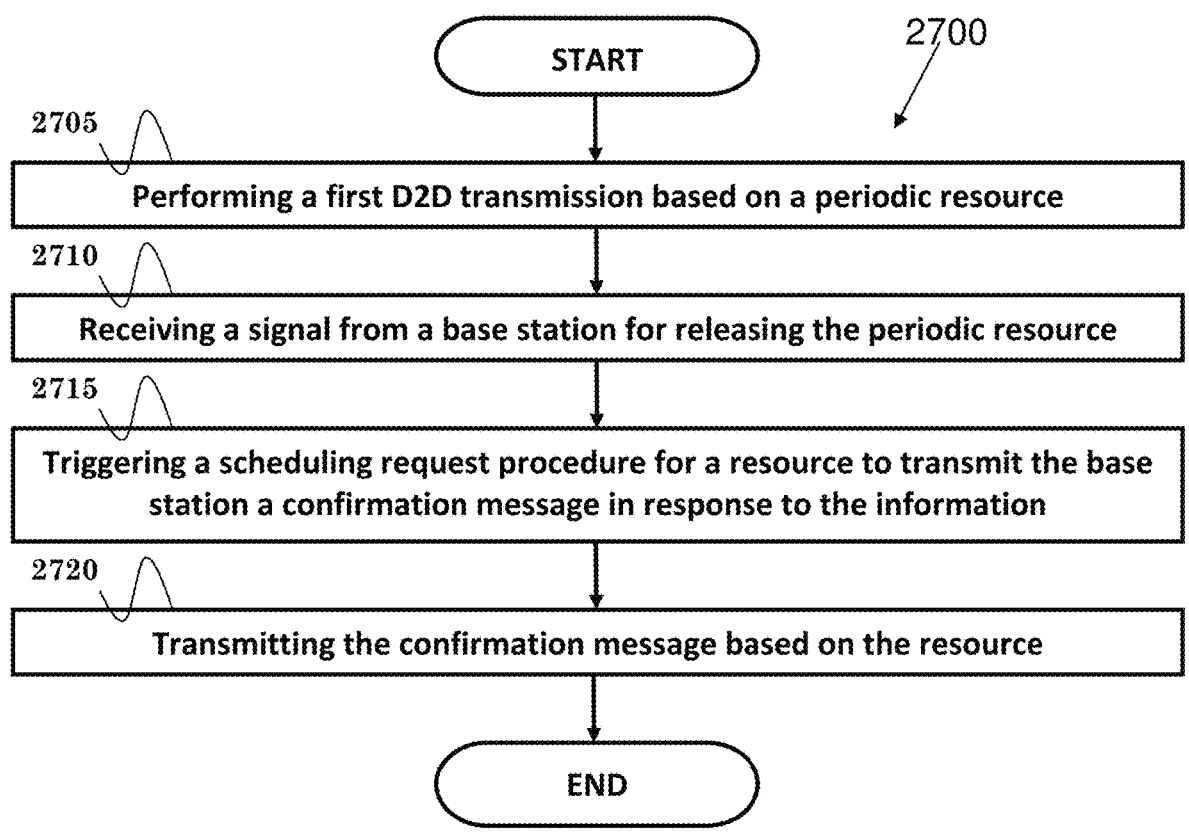
FIG. 27 is a flow chart according to one exemplary embodiment.

FIG. 27 is a flow chart 2700 according to one exemplary embodiment from the perspective of a UE. In step 2705, the UE performs a first D2D transmission based on a periodic resource. In step 2710, the UE receives an information from a base station for releasing the periodic resource. In step 2715, the UE triggers a scheduling request procedure for a resource to transmit the base station a confirmation message in response to the information. In step 2720, the UE transmits the confirmation message based on the resource.

In one embodiment, the confirmation message could be for confirming the release of the periodic resource. The confirmation message could also be for confirming reception of the information. The confirmation message could be a MAC CE, a PDCCH signal, a DCI, or a RRC message.

In one embodiment, the resource could be an uplink grant.

In one embodiment, the information could be a RRC message, a RRC reconfiguration, a PDCCH signal, or a DCI. The information could also be a DCI or a PDCCH signal or a RRC message for bandwidth part switching or bandwidth part change. Furthermore, the information could be a DCI or a PDCCH signal scrambled with D2D-CS-RNTI. In addition, the information could be a MAC CE.

In one embodiment, the periodic resource could be a SPS resource. The periodic resource could also be a configured sidelink grant corresponding to transmissions of multiple MAC PDUs. The periodic resource could be selected by the UE. The periodic resource could also be allocated by a base station.

In one embodiment, the periodic resource could be a resource used for D2D communication. Alternatively, the periodic resource may not be used for performing uplink transmission.

Referring back to FIGS. 3 and 4, in one exemplary embodiment of a UE, the device 300 includes a program code 312 stored in the memory 310. The CPU 308 could execute program code 312 to enable the UE (i) to perform a first D2D transmission based on a periodic resource, (ii) to receive a signal from a base station for releasing the periodic resource, (iii) to trigger a scheduling request procedure for a resource to transmit the base station a confirmation message in response to the information, and (iv) to transmit the confirmation message based on the resource. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
performing, by the UE, a first device-to-device (D2D) transmission based on a periodic resource;
performing, by the UE, a second D2D transmission based on the periodic resource in response to no data available for the second D2D transmission, wherein the second D2D transmission includes a second sidelink control information, and the second sidelink control information includes a field indicating reservation period equal to a zero value or a special value for release of the periodic resource; and
stopping, by the UE, using the periodic resource to perform a third D2D transmission.

2. The method of claim 1, wherein the first D2D transmission includes a first sidelink control information, wherein the first sidelink control information indicates a corresponding first sidelink data transmission.

3. The method of claim 2, wherein the first sidelink control information includes a field indicating reservation period equal to a non-zero value.

4. The method of claim 1, wherein the first D2D transmission includes a first sidelink data transmission.

5. The method of claim 4, wherein the first sidelink data transmission includes at least one MAC (Medium Access Control) SDU (Service Data Unit).

6. The method of claim 1, wherein the second sidelink control information includes a field indicating the periodic resource release.

7. The method of claim 1, wherein the second D2D transmission includes a second sidelink data transmission.

8. The method of claim 1, wherein the second sidelink data transmission includes a MAC (Medium Access Control) CE (Control Element) indicating the release of the periodic resource or includes padding bits and no MAC SDU (Service Data Unit).

9. The method of claim 1, wherein the periodic resource is a configured sidelink grant corresponding to transmissions of multiple MAC (Medium Access Control) PDUs (Protocol Data Units), and is selected by the UE or allocated by a base station.

10. A method for a UE (User Equipment), comprising:
performing, by the UE, a first device-to-device (D2D) transmission based on a periodic resource;
receiving, by the UE, a signal from a base station for releasing the periodic resource;
performing, by the UE, a second D2D transmission based on the periodic resource in response to reception of the signal, wherein the second D2D transmission includes a second sidelink control information, and the second sidelink control information indicates reservation period equal to a zero value for release of the periodic resource; and stopping, by the UE, using the periodic resource to perform a third D2D transmission.

11. The method of claim 10, further comprising:
performing a SPS (Semi-Persistent Scheduling) confirmation transmission to the base station in response to reception of the signal.

12. The method of claim 10, wherein the signal is a PDCCH (Physical Downlink Control Channel) signal, MAC (Medium Access Control) CE (Control Element), or RRC (Radio Resource Control) message.

13. The method of claim 10, wherein the signal is a DCI (Downlink Control Information) or a PDCCH (Physical Downlink Control Channel) signal scrambled with D2D-CS RNTI (D2D-Configured Scheduling-Radio Network Temporary Identifier).

14. The method of claim 10, wherein the signal is a DCI (Downlink Control Information) or a PDCCH (Physical Downlink Control Channel) signal or a RRC (Radio Resource Control) message for bandwidth part switching or change.

15. The method of claim 10, wherein the periodic resource is a configured sidelink grant corresponding to transmissions of multiple MAC (Medium Access Control) PDUs (Protocol Data Units), and is allocated by the base station.

16. A User Equipment (UE), comprising:
a control circuit;
a processor installed in the control circuit; and
a memory installed in the control circuit and operatively coupled to the processor;
wherein the processor is configured to execute a program code stored in the memory to:
perform, by the UE, a first device-to-device (D2D) transmission based on a periodic resource;
perform, by the UE, a second D2D transmission based on the periodic resource in response to no data available for the second D2D transmission, wherein the second D2D transmission includes a second sidelink control information, and the second sidelink control information includes a field indicating reservation period equal to a zero value or a special value for release of the periodic resource; and
stop, by the UE, using the periodic resource to perform a third D2D transmission.

17. The UE of claim 16, wherein the second D2D transmission includes a second sidelink data transmission and the second sidelink data transmission includes a MAC (Medium Access Control) CE (Control Element) indicating the release of the periodic resource or includes padding bits and no MAC SDU (Service Data Unit).

* * * * *